(12) United States Patent
Kimberlin et al.

(10) Patent No.: US 9,106,054 B2
(45) Date of Patent: Aug. 11, 2015

(54) LASER DEVICE AND METHOD

(71) Applicant: LEE LASER, INC., Orlando, FL (US)

(72) Inventors: Dwight Kimberlin, Orlando, FL (US); Donald Bishop, Orlando, FL (US)

(73) Assignee: LEE LASER, INC., Orlando, FL (US)

( * ) Notice: Subject to any disclaimer, the term of this patent is extended or adjusted under 35 U.S.C. 154(b) by 0 days.

(21) Appl. No.: 14/187,308

(22) Filed: Feb. 23, 2014

(65) Prior Publication Data
US 2014/0204965 A1    Jul. 24, 2014

Related U.S. Application Data

(62) Division of application No. 13/932,180, filed on Jul. 1, 2013, now Pat. No. 8,693,511, which is a division of application No. 12/481,784, filed on Jun. 10, 2009, now Pat. No. 8,509,272.

(51) Int. Cl.
*H01S 3/127* (2006.01)
*G02B 27/10* (2006.01)
(Continued)

(52) U.S. Cl.
CPC ............ *H01S 3/127* (2013.01); *G02B 19/0028* (2013.01); *G02B 19/0057* (2013.01);
(Continued)

(58) Field of Classification Search
CPC ....... H01S 3/1611; H01S 3/1643; H01S 3/23; H01S 3/11; H01S 3/09415; H01S 3/127
USPC .............................................. 372/17, 68, 97
See application file for complete search history.

(56) References Cited

U.S. PATENT DOCUMENTS 3,510,798 A    5/1970   Briones
3,855,544 A  * 12/1974  Bowness ........................ 372/97
(Continued)

FOREIGN PATENT DOCUMENTS

EP    0568727 B1   7/1997
JP    63-136897 A  9/1988
JP    01-173679 A  10/1989

OTHER PUBLICATIONS

Demske, David Leonard. "Master-Oscillator-Power-Amplifier (MOPA) Laser Sources Used as Drive Lasers for Photoinjectors for High-Gain, Free Electron Lasers (FELs)". Dec. 5, 2005, pp. 1-14, University of Maryland, College Park, Maryland, USA.
(Continued)

*Primary Examiner* — Jessica Stultz
*Assistant Examiner* — Michael Carter
(74) *Attorney, Agent, or Firm* — Woodling, Krost and Rust

(57) ABSTRACT

A laser beam combining and power scaling device and method. A first highly reflective mirror residing perpendicular to the first optical axis reflecting radiation emitted from the first laser head. A first Q-switch in alignment with the first optical axis interposed between the first highly reflective mirror and the first laser head. A second highly reflective mirror residing perpendicular to the second optical axis reflecting radiation emitted from the second laser head. The second Q-switch in alignment with the second optical axis is interposed between the second highly reflective mirror and the first laser head. A third optical axis is coincident with the first optical axis. A third highly reflective mirror residing perpendicular to the third optical axis in alignment therewith. The third optical axis may include a third diode pumped laser head and Q-switch. A beam splitter resides at the intersection of the axes.

6 Claims, 13 Drawing Sheets

(51) Int. Cl.
  *G02B 27/14* (2006.01)
  *G02B 19/00* (2006.01)
  *H01S 3/0941* (2006.01)
  *H01S 3/11* (2006.01)
  *H01S 3/16* (2006.01)
  *H01S 3/23* (2006.01)

(52) U.S. Cl.
  CPC ........ *G02B27/1006* (2013.01); *G02B 27/1073* (2013.01); *G02B 27/144* (2013.01); *G02B 27/145* (2013.01); *H01S 3/09415* (2013.01); *H01S 3/11* (2013.01); *H01S 3/1611* (2013.01); *H01S 3/1643* (2013.01); *H01S 3/23* (2013.01)

(56) References Cited

U.S. PATENT DOCUMENTS

| | | | |
|---|---|---|---|
| 4,145,714 A | 3/1979 | MacDonald | |
| 4,560,273 A | 12/1985 | Ando et al. | |
| 4,596,037 A | 6/1986 | Bouchard et al. | |
| 4,667,231 A | 5/1987 | Pryor | |
| 4,707,073 A | 11/1987 | Kocher | |
| 4,712,916 A | 12/1987 | Gunn | |
| 4,805,181 A | 2/1989 | Gibson | |
| 4,857,697 A | 8/1989 | Melville | |
| 4,865,448 A | 9/1989 | Akutsu | |
| 4,873,417 A | 10/1989 | Moriyasu | |
| 5,029,964 A * | 7/1991 | Edwards et al. | 385/33 |
| 5,081,636 A | 1/1992 | Bishop | |
| 5,093,551 A | 3/1992 | Bishop | |
| 5,197,105 A | 3/1993 | Uemura et al. | |
| 5,307,369 A | 4/1994 | Kimberlin | |
| 5,557,625 A | 9/1996 | Durville | |
| 5,610,710 A | 3/1997 | Canfield et al. | |
| 5,856,996 A | 1/1999 | Durkin et al. | |
| 5,999,555 A | 12/1999 | Connors et al. | |
| 6,014,401 A | 1/2000 | Godard et al. | |
| 6,115,296 A | 9/2000 | Ando | |
| 6,396,068 B1 | 5/2002 | Sweatt et al. | |
| 6,963,396 B2 | 11/2005 | Kimberlin | |
| 7,041,933 B2 | 5/2006 | Forrester et al. | |
| 7,289,549 B2 | 10/2007 | Sun et al. | |
| 7,301,981 B2 | 11/2007 | Sun et al. | |
| 7,348,516 B2 | 3/2008 | Sun et al. | |
| 7,396,706 B2 | 7/2008 | Sun et al. | |
| 2003/0128732 A1 * | 7/2003 | Ishizu | 372/75 |
| 2008/0037597 A1 * | 2/2008 | Mason et al. | 372/13 |

OTHER PUBLICATIONS

Ciu Qian-Jin, et al, "Highly Efficient Diode-Sided-Pumped Six-Rod Nd:YAG Laser", Chin. Phys. Lett. Jun. 5, 2008, pp. 3991-3994. vol. 25, No. 11 (2008); Chinese Physical Society and IOP Publishing Ltd, Bristol, UK.

Ikeda, Naoaki et al. "Diode-Pumped Solid-State Ultraviolet Laser Micro Processing System", Technical Review, Jan. 2003, pp. 1-5, vol. 40 Extra No. 2, Mitsubishi Heavy Industries, Ltd.

Herbst, Ludolf et al. "High Peak Power Solid State Laser for Micromachining of Hard Materials", Jan. 7, 2003, SPIE USE, vol. 2, pp. 4968-4914, SPIE, Bellingham, WA 98227-0010 USA.

Gooch & Housego, "'Industry Standard' Acousto-Optic Q-Switch", Jun. 2009, pp. 1-2, http://www.goochandhousego.com/files/Industry%20standard%20Q-Switch%20data%20sheet.pdf, GOOCH & HOUSEGO PLC, Somerset, UK.

* cited by examiner

PRIOR ART

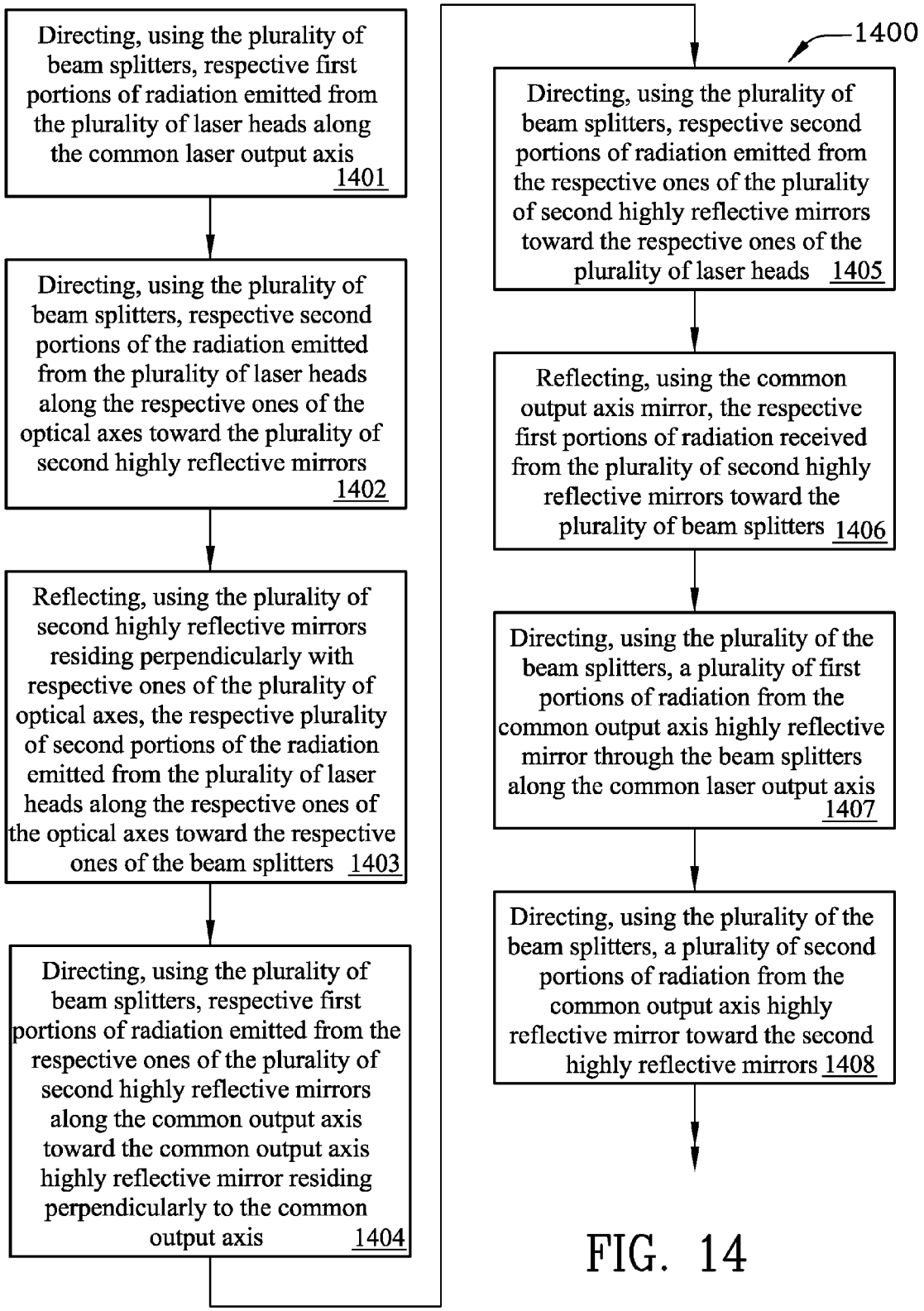

LASER DEVICE AND METHOD

This patent application is a divisional patent application of U.S. patent application Ser. No. 13/932,180 filed Jul. 1, 2013, now U.S. Pat. No. 8,693,511, issued Apr. 8, 2014, which is a divisional of U.S. patent application Ser. No. 12/481,784, filed Jun. 10, 2009, now U.S. Pat. No. 8,509,272 issued Aug. 13, 2013.

FIELD OF THE INVENTION

The invention is in the field of producing and transmitting laser beams ranging from high energy, stacked pulses having low frequency to low energy, sequenced pulses having high frequency. The invention includes lasers which are continuously pumped with light emitting diodes, lasers which are continuously lamp pumped and lasers which are current pulsed. In the instance of current pulsed lasers when the frequency of the pulsations are sufficiently high, a pseudo continuous wave may be produced. LASER is an acronym of Light Amplification by Stimulated Emission of Radiation. Laser radiation includes wavelengths which extend substantially from the infrared to the ultraviolet range.

BACKGROUND OF THE INVENTION

U.S. Pat. No. 5,307,369 to Kimberlin, one of the applicants in the instant patent application, discloses in the abstract thereof: "A system for combining a plurality of laser beams into a combined output beam from at least two laser sources includes the removal of conventional perpendicularly oriented output windows from each of the laser sources. Reflecting mirrors are positioned perpendicular to the optical axis at the rear of the two laser sources. A fully reflecting mirror is positioned perpendicular to the optical axis of the first laser source to reflect coherent light received from the first laser source. A beam splitter is positioned between the first laser source and the fully reflecting mirror at the intersection of the optical axes of the first and second laser source. The beam splitter directs a portion of received coherent light into a combined output beam, with the remainder being directed back to the first and second laser sources."

Referring to FIG. 4 of the instant patent application (a reproduction of FIG. 1 of the '369 Kimberlin patent specification, referred to by reference numeral 400 herein), and col. 4, line 47 to col. 5, line 64, it is stated that:

"In operation, laser output (represented by line 50) is produced by sustained resonant oscillation of coherent light through the laser sources 20 and 22, as controlled by multiple reflections off mirrors 30, 32, 36, and beam splitter 40. These coherent light reflections are represented by lines 51, 52, 55, and 56, which are intended to represent coherent light traveling in both directions along the lines. Laser beam combination proceeds, for example, by simultaneously pumping the active medium of laser sources 20 and 22 with flash lamps (not shown). A photon leaving the laser source 20 can be randomly directed, for example, toward the first reflecting mirror 30. This photon (shown as line 51) is reflected from the mirror 30, and reverses its direction to move back into the laser source 20. Here the photon encounters an active atom at an upper energy, which it stimulates to emit another photon of identical frequency, polarization, and direction. The pair of coherent photons respectively-encounter additional active atoms in the active medium to create still more coherent photons. The coherent photons eventually leave the laser source 20 to pass toward the beam splitter 40. When the coherent photons encounter the beam splitter 40, about 50% are reflected to provide output beam 50. The remainder pass through splitter 40 and proceed (line 54) to be reflected backwards from fully reflective mirror 36 towards the beam splitter 40. Again, about 50% of the coherent photons are reflected, but this time they are directed toward the laser source 22. The remaining coherent photons proceed (line 53) back toward laser source 20. These coherent photons pass through the laser source 20 to create still more coherent photons, which exit the laser amplifier for reflection from the mirror 30. This positive feedback process is multiply repeated to create substantial numbers of coherent photons, at least until the number of active atoms in the active medium drops below substainable (sic, "sustainable") lasing threshold. A certain percentage of coherent photons directed toward the laser source 22 by reflection from beam splitter 40 also eventually proceed back along line 52 to sustain coherent photon production, similar to that previously described for those coherent photons that travel from line 54 through beam splitter 40 and along lines 53, 52. The coherent photons reflected (line 55) by beam splitter 40 toward laser source 22 pass into the laser source to trigger a coherent photon cascade similar to that described in connection with laser amplifier 20. The coherent photons leave the laser source 22 (line 56), are reflected back into the laser source 22 to trigger production of still more coherent photons. These photons leave (line 55) the laser source directed toward the beam splitter 40. About 50% of the coherent photons pass through the beam splitter 40 are combined with coherent photons arriving from the laser source 20 (lines 52 and 53). The remaining coherent photons are directed (line 54) toward mirror 36, which as previously described reflects the coherent photons toward the beam splitter 40. The process of coherent photon production, with some coherent photons passing through the beam splitter 40 toward laser source 20, and the remaining coherent photons being directed back to laser source 22, is again repeated. Although the exact energy of the combined output beam 50 depends upon the active medium employed, scattering and absorption losses, time and energy of pumping action, and other factors known to those skilled in the art, typically two 400 watt laser sources can be combined as described to produce about 800 watts of laser output with minimal degradation in beam diameter and focus as compared to a 400 watt laser amplifier alone. As will be appreciated by those skilled in the art, pulsed operation is not required for operation of the described embodiment. Low power continuous laser amplifiers can also be combined to double the power of the output beam. In addition, the system 10 as shown in FIG. 1 can also be operated to increase repetition of laser pulses. Instead of simultaneously pumping the laser sources 20 and 22, the laser sources 20 and 22 are alternately pumped, providing a series of laser beams directed along the same optical axis. In this mode, losses due to absorption and scattering in the non-active, "cold" laser source are slightly increased, but the repetition rate of the system can be doubled as compared to a single laser amplifier, while still delivering full rated power."

The '369 patent to Kimberlin employed a lamp pumping system which produced combined and/or sequenced laser pulses. Two systems sold by Electrox, assignee of the '369 Kimberlin patent, employed a third laser head (laser source) disposed in line 54 of FIG. 1 of the '369 patent to Kimberlin.

A standard laser system 100 illustrated in FIG. 1 comprises a gain medium 101 with a highly reflective rear mirror 103 and a partially reflective output coupler 102 through which the output beam 106 exits. Reference numerals 104, 105 and 106 represent the output axis.

Two current methods for power scaling of laser systems include multiple intra-cavity oscillators as illustrated in FIG.

2 and a MOPA system (Master Oscillator/Power Amplifier) as illustrated in FIG. 3. The multiple intra-cavity oscillator method 200 combines multiple gain mediums 101, 201 between the highly reflective mirror 103 and the partially reflective mirror/50% output coupler 203. Reference numeral 202 represents the optical axes and the output of the second laser head 201. The laser output after the coupler is represented by reference numeral 204.

The MOPA system 300 illustrated in FIG. 3 uses a typically low power oscillator (such as laser head 101) which seeds a second laser 301 via a partially reflective output coupler 302. Reference numeral 303 represents the optical axis and reference numeral 304 represents the laser output.

There are major disadvantages encountered with both of these methods. One of the main disadvantages is that as power is scaled up, some or all of the laser heads have all the laser power being transmitted through them. This causes increased stress and heating on the optical components, substantially lowers the quality of the laser beam, creates lensing and optical waists that shift throughout the system, and severely limits the power scaling achievable. A second major disadvantage is that under both of these methods, the individual lasers cannot lase efficiently independently.

Long pulse width (duration) at high power levels are problematic in that they cause recast layers, heat affected zones, micro-cracking and delamination of materials. Therefore, it is necessary to accurately control the pulse width(s), stacking, sequencing and power of laser beams.

SUMMARY OF THE INVENTION

Continuous wave lasers produce a steady beam at an essentially constant power output. Pulsed lasers emit their energy in short duration bursts.

In the current pulsed laser disclosed and claimed herein, the multi laser head configuration provides an adjustable output ranging from high energy, power stacked pulses at low frequency to low energy, sequenced pulses at very high frequency or any permutation of these parameters. When the current pulsed multi-lasers are operated at a sufficiently high frequency of operation, the pulsed output is increased yielding characteristics of a continuous wave (pseudo continuous wave). Most user applications of lasers, for example, in the semiconductor and photovoltaic end user applications, are driven by high throughput (rapid and efficient) manufacturing requirements.

The device and method disclosed herein yields a very flexible high power laser which enables control of the energy (Joules, J), average power (Joules/second, Watts) and pulse width (nano or micro-seconds). Q-switched systems are operated such that the optical output pulses are in nanoseconds. Current pulsed systems are operated such that the optical output pulses are in microseconds.

The laser heads are preferably diode pumped, are energized 100% of the operational time, and are controlled by Q-switches. This is known as continuous wave Q-switched operation. Multiple heads may be fired synchronously (simultaneously), sequentially, or sequentially with time gaps between firings. The Q-switches may be operated to yield an output combining the outputs of the individual laser heads.

Pseudo continuous wave (CW) is only possible when the multiple laser heads are current pulsed. If the firing repetition rate is high enough then a pseudo continuous wave is produced from the multiple heads.

The multiple laser heads may alternatively be controlled by current pulsing the laser heads. Current pulsing of an individual pulsed laser system is limited in the maximum duty cycle attainable depending on the system. In the disclosure made herein, the system is not limited by the duty cycle as the outputs of the laser heads may be combined. The duty cycle is equal to the ratio of the pulse duration divided by the pulse repetition time (pulse cycle length or time).

The innovative laser optics design combined disclosed herein together with an industrial-grade power supply results in an extraordinarily reliable and rugged diode-pumped Nd:YAG laser for industrial use. Efficient diode optical pumping is employed for improved performance and reliability. Optical beams are combined using two, three or more diode pumped heads. Q-switched pulse stability is less than 3.5% RMS up to operational frequencies of 15 kHz. Q-switches are water cooled acousto-optical switches. The laser is operated at a wavelength of 1064 nm in the multimode transverse mode. The nominal beam waist diameter is 3.7 mm with a full angle nominal beam divergence of 12 mr (milliradians). Polarization is random. The frame of the power station is 84 cm high, 60 cm wide and 85 cm deep. Optical rail length is standard 26 cm high, 107 cm long and 56 cm wide. Recommended power supply is 220 VAC, 3-phase, 50-60 Hz at 40 amps.

The specifications set forth above are by way of example only. Wavelength, rod size, beam diameter, polarization may vary. Multiple wavelengths, for example, infrared at 1064 nm, green at 532 nm, and ultraviolet at 355 nm, as well as others may be used. Lamp-pumped or diode-pumped systems may be used. Various beam sizes and divergence levels may be employed. The lasers may be continuously energized with the optical output being Q-switched.

The lasers may, alternatively, be current pulsed. Current pulsing of multiple laser heads with sufficiently high frequency yields a pseudo continuous wave optical output. Q-switching yields short pulse durations and cannot provide pseudo continuous wave output because the number of heads necessary would be excessive to produce a pseudo continuous wave output.

A first example of the laser beam combining and power scaling device is disclosed and claimed. The device includes first, second and third NdYAG laser heads. The invention is applicable to other types of laser mediums including gas. The first laser head has a first optical axis and is diode pumped. A first highly reflective mirror resides perpendicular to the first optical axis in alignment therewith behind the first laser head reflects radiation when emitted from the first laser head. The second laser head has a second optical axis and is diode pumped. A second highly reflective mirror resides perpendicular to the second optical axis in alignment therewith behind the second laser head reflects radiation when emitted from the second laser head.

The third laser head has a third optical axis and is diode pumped. A third highly reflective mirror resides perpendicular to the third optical axis in alignment therewith behind the third laser head. The first and third optical axes are coincident. The second optical axis perpendicularly intersects the first and the third optical axes. A beam splitter resides at the intersection of the second optical axis and the first and third optical axes. The laser output has a laser output axis coincident with the second optical axis.

The first laser head emits radiation along the first axis into and through the beam splitter, the beam splitter directing a first portion of the radiation emitted from the first laser head into the third laser head along the third optical axis. The beam splitter directs a second portion of the radiation emitted from the first laser head along the laser output axis coincident with the second optical axis.

The third laser head emits radiation along the third axis into and through the beam splitter. The beam splitter directs a first portion of the radiation emitted from the third laser head into the first laser head along the first optical axis and the beam splitter directs a second portion of the radiation emitted from the third laser head along the second optical axis into the second laser head.

The second laser head emits radiation along the second axis into and through the beam splitter, the beam splitter directs a first portion of the radiation emitted from the second laser head along the laser output axis. The beam splitter directs a second portion of the radiation emitted from said second laser head along the third optical axis and into the third laser head. The laser output emits radiation from the first, second and third laser heads along the laser output axis.

A first Q-switch is positioned in alignment with the first optical axis between the first highly reflective mirror and the first laser head. A second Q-switch is positioned in alignment with the second optical axis between the second highly reflective mirror and the second laser head. A third Q-switch is positioned in alignment with the third optical axis between the third highly reflective mirror and the third laser head. The first, second and third Q-switches are vertical Q-switches which divert the laser beam (radiation) vertically.

A fourth Q-switch is positioned in alignment with the first optical axis between the first highly reflective mirror and the first laser head. A fifth Q-switch is positioned in alignment with the second optical axis between the second highly reflective mirror and the second laser head. A sixth Q-switch is positioned in alignment with the third optical axis between the third highly reflective mirror and the third laser head. The fourth, fifth and sixth Q-switches are horizontal Q-switches which divert the laser beam (radiation) horizontally.

A first control device which varies the timing, frequency and duration of control signals to the Q-switches is disclosed and claimed.

One example of the actuation of the Q-switches includes simultaneous modulation thereof producing a short duration, high power radiation pulse in the laser output axis wherein the high power radiation pulse is the sum of the power produced by the first, second, and third laser heads.

Another example of the actuation of the Q-switches includes modulation of the first, second, and third Q-switches sequentially without any time between pulses, and, results in a short duration, high power radiation pulse in the laser output axis, and each of the high power radiation pulses is substantially equal to the individual power of the first and second laser heads.

Another example of the actuation of the Q-switches includes modulation of the first, second, and third Q-switches sequentially but with time gaps therebetween, and, results in the provision of a series of short duration temporally spaced apart, high power radiation pulses in the laser output axis, each of the high power radiation pulse is substantially equal to the individual power of the first and second laser heads.

A laser beam combining and power scaling method using a plurality of laser heads arranged in parallel is disclosed and claimed. The method uses a plurality of laser heads emitting radiation, a plurality of respective optical axes aligned with respective ones of the plurality of laser heads, a plurality of first highly reflective mirrors residing perpendicularly with respect to respective ones of the plurality of the optical axes and behind respective ones of the plurality of the laser heads, a plurality of second highly reflective mirrors residing perpendicularly with respect to respective ones of the plurality of optical axes, a plurality of beam splitters arranged at an incidence angle with respect to respective ones of the optical axes and residing intermediate the respective ones of the plurality of laser heads and the plurality of second highly reflective mirrors, a common laser output axis, and a common output axis highly reflective mirror residing perpendicularly along the common laser output axis. The method includes the steps of: directing, using the plurality of beam splitters, respective first portions of radiation emitted from the plurality of laser heads along the common laser output axis; directing, using the plurality of beam splitters, respective second portions of the radiation emitted from the plurality of laser heads along the respective ones of the optical axes toward the plurality of second highly reflective mirrors; reflecting, using the plurality of second highly reflective mirrors residing perpendicularly with respect to respective ones of the plurality of optical axes, the respective plurality of second portions of the radiation emitted from the plurality of laser heads along the respective ones of the optical axes toward the respective ones of the beam splitters; directing, using the plurality of beam splitters, respective first portions of radiation emitted from the respective ones of the plurality of second highly reflective mirrors along the common output axis toward the common output axis highly reflective mirror residing perpendicularly to the common output axis; directing, using the plurality of beam splitters, respective second portions of radiation emitted from the respective ones of the plurality of second highly reflective mirrors through the beam splitter toward the respective ones of the plurality of laser heads; reflecting, using the common output axis mirror, the respective first portions of radiation received from the plurality of second highly reflective mirrors toward the plurality of beam splitters; directing, using the plurality of the beam splitters, a plurality of first portions of radiation from the common output axis highly reflective mirror and along the common laser output axis; and, directing, using the plurality of the beam splitters, a plurality of second portions of radiation from the common output axis highly reflective mirror toward said plurality of second highly reflective mirror.

Further, the process may include the following steps: controlling, using a first control device, the timing, frequency and duration of the actuation of the Q-switches, and controlling, using a second control device, the timing, frequency and duration of the pumping of the laser heads; and, outputting, radiation from the laser heads along the common laser output axis. The process may include the following steps: controlling, using said first control device, the timing, frequency and duration of the actuation of the Q-switches which includes modulation of the Q-switches simultaneously, and further comprising the step of: providing a short duration, high power radiation pulse in the common laser output axis, the high power radiation pulse is the sum of the power produced by the plurality of laser heads arranged in parallel.

Alternatively, the process may include the following steps: controlling, using the first control device, the timing, frequency and duration of the actuation of the Q-switches which includes modulation of the Q-switches sequentially without any time between pulses, and, further comprises the step of: providing a short duration, high power radiation pulse in the common laser output axis, the high power radiation pulse is substantially equal to the individual power of each one of the plurality of laser heads.

Alternatively, the process may include the following steps: controlling, using the first control device, the timing, frequency and duration of the actuation of the Q-switches which includes modulation of the first and second Q-switches sequentially but with time gaps therebetween, and, further comprises the step of: providing a series of short duration temporally spaced apart, high power radiation pulses in the common laser output axis, the high power radiation pulse are substantially equal to the individual power of each one of the plurality of the laser heads.

It is an object of the invention to provide a multi-laser head configuration which has an adjustable output ranging from high energy, power stacked pulses at low frequency to low energy, sequenced pulses at very high frequency or any permutation of these parameters in the aforesaid range.

It is an object of the invention to provide a current pulsed multi-laser head configuration which has an adjustable output ranging from high energy, power stacked pulses at low frequency to low energy sequenced pulses at very high frequency or any permutation of these parameters in the aforesaid range wherein said laser heads are current pulse pumped so as to produce a pseudo continuous wave optical output.

It is an object of the invention to provide a continuously pumped multi-laser head configuration which is Q-switched and which may combine the beams in a common output or which may provide a pulsed output.

It is an object of the invention to provide a multi-laser head configuration which has an adjustable output ranging from high energy, power stacked pulses at low frequency to low energy, sequenced pulses at very high frequency or any permutation of these parameters in the aforesaid range wherein said laser heads are pumped with current pulses.

It is an object of the invention to provide a multi-laser head configuration which provides a short duration, high power radiation pulse in the common laser output axis, the high power radiation pulse is the sum of the power produced by the plurality of laser heads arranged in parallel.

It is an object of the invention to provide a multi-laser head configuration which provides a short duration, high power radiation pulse in the common laser output axis, the high power radiation pulse is substantially equal to the individual power of each one of the plurality of laser heads.

It is an object of the invention to provide a multi-laser head configuration which provides a series of short duration temporally spaced apart, high power radiation pulses in the common laser output axis, the high power radiation pulses are substantially equal to the individual power of each one of the plurality of the laser heads.

It is an object to provide a q-switched beam combining system which is used to narrow the optical pulse width at a given power level compared to a single laser at the same given power level.

These and other objects will be better understood when reference is made to the drawings and the description of the invention set forth below.

BRIEF DESCRIPTION OF THE DRAWINGS

FIGS. 14 and 14A are a schematic illustration of another exemplary method of a laser beam combining and power scaling using a plurality of parallel laser heads arranged with a series of beam splitters and a common output axis.

A better understanding of the invention will be had when reference is made to the following description of the invention below.

DESCRIPTION OF THE INVENTION

Diode pumped solid state lasers have long lifetimes and enjoy high efficiencies. High electrical to optical efficiency leads to high overall power efficiency of the laser.

Gain switched pulsed solid state lasers yield irregular pulses, namely, the pulses are irregular with respect to peak power, pulse width and repetition frequency. Q-switching greatly increases the peak power and the pulse widths have a short duration between several nanoseconds ($10^{-9}$) and one microsecond ($10^{-6}$) and can yield very high peak intensities. Q-switching is a method of laser generation where energy is stored in the laser medium and is suddenly released in a short pulse. The "Q" in "Q-switching" is the optical quality factor and is the ratio of the energy stored in the laser cavity to the energy lost per cycle.

When the active medium of the laser is pumped (energized), the beam path is redirected resulting in a low Q factor and laser emission is prevented. Energy is stored in the active medium and the beam is returned to proper alignment and most of the stored energy is released in a short pulse. A Q switch may be thought of as a shutter between the active medium of the laser and the highly reflective mirror.

Laser machining is material removal accomplished by laser material interaction including, but not limited to, laser drilling, laser cutting, laser grooving, marking or scribing. Machining or material removal with lasers involves absorption of laser radiation by the material, transmission and redistribution of the energy within the material to be machined or altered, and removal of the material by evaporation and/or melting (and removal by ejection of vacuum). Laser parameters which affect machining include wavelength, pulse width and energy, and beam intensity. Shortening of pulse length and increasing beam intensity facilitates machining with lasers.

Shortening of pulse length and increase in beam intensity results in much thinner recast layers and heat affected zones (HAZ) and less micro-cracking or de-lamination of materials.

Figure 1:
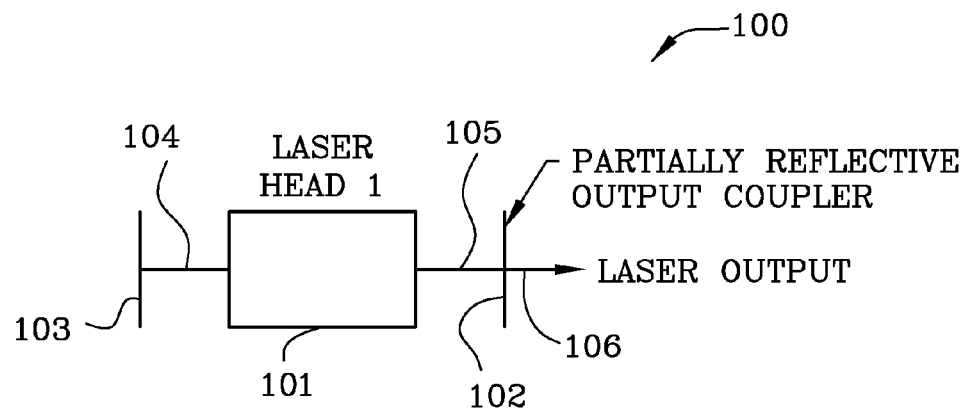
FIG. 1 is a schematic of the prior art illustrating a laser head, a highly reflective mirror, and a partially reflective mirror (output coupler).
Figure 2:
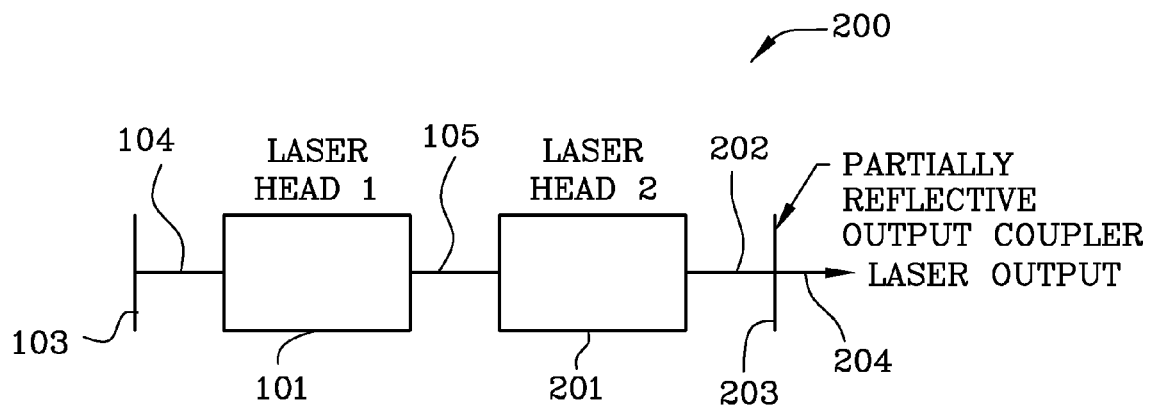
FIG. 2 is a schematic of the prior art illustrating an intracavity oscillator which employs multiple laser heads (gain mediums) between a highly reflective mirror and the partially reflective mirror (output coupler).
Figure 3:
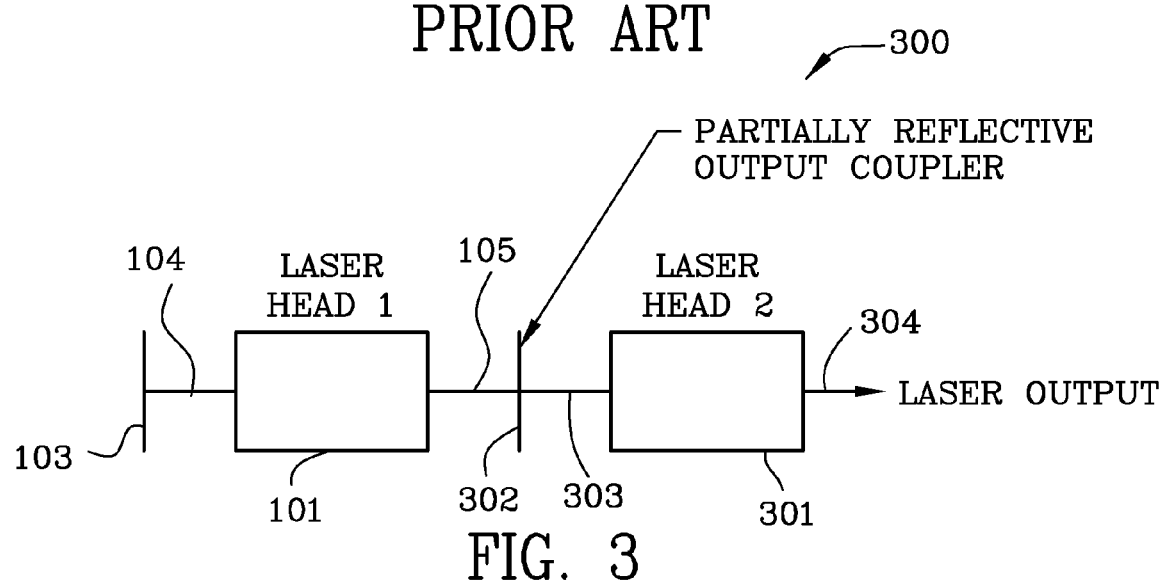
FIG. 3 is a schematic of the prior art illustrating a Master Oscillator/Power Amplifier (MOPA) system using a low power oscillator which seeds a laser medium.
Figure 4:
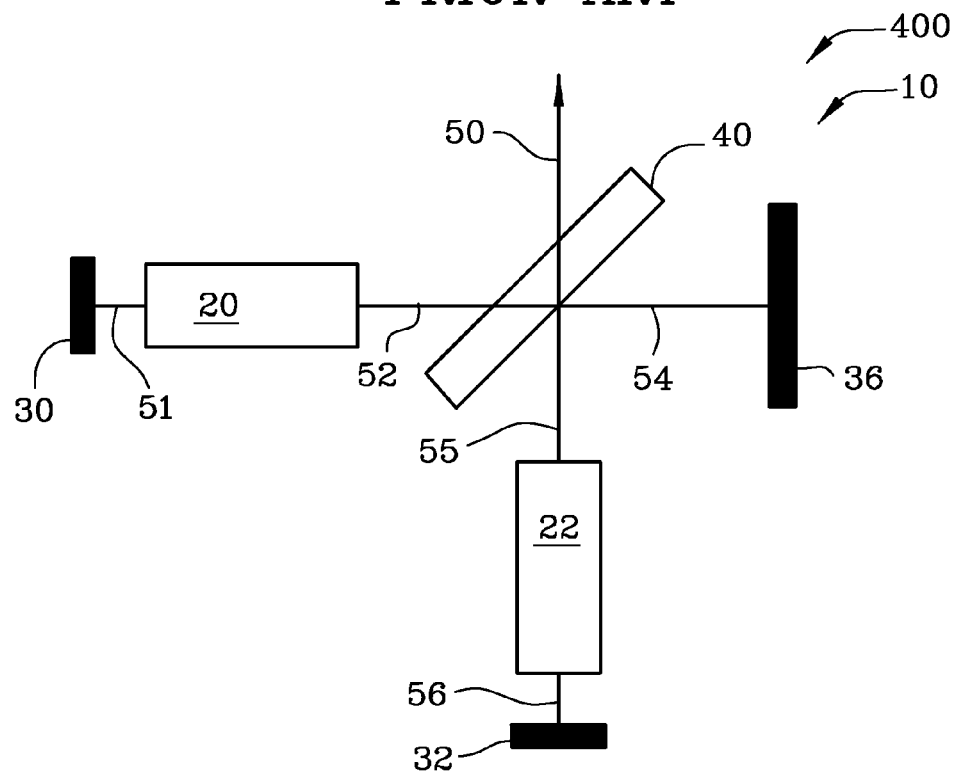
FIG. 4 is an illustration from prior art U.S. Pat. No. 5,307,369, entitled Laser Beam Combination System.
Figure 5:
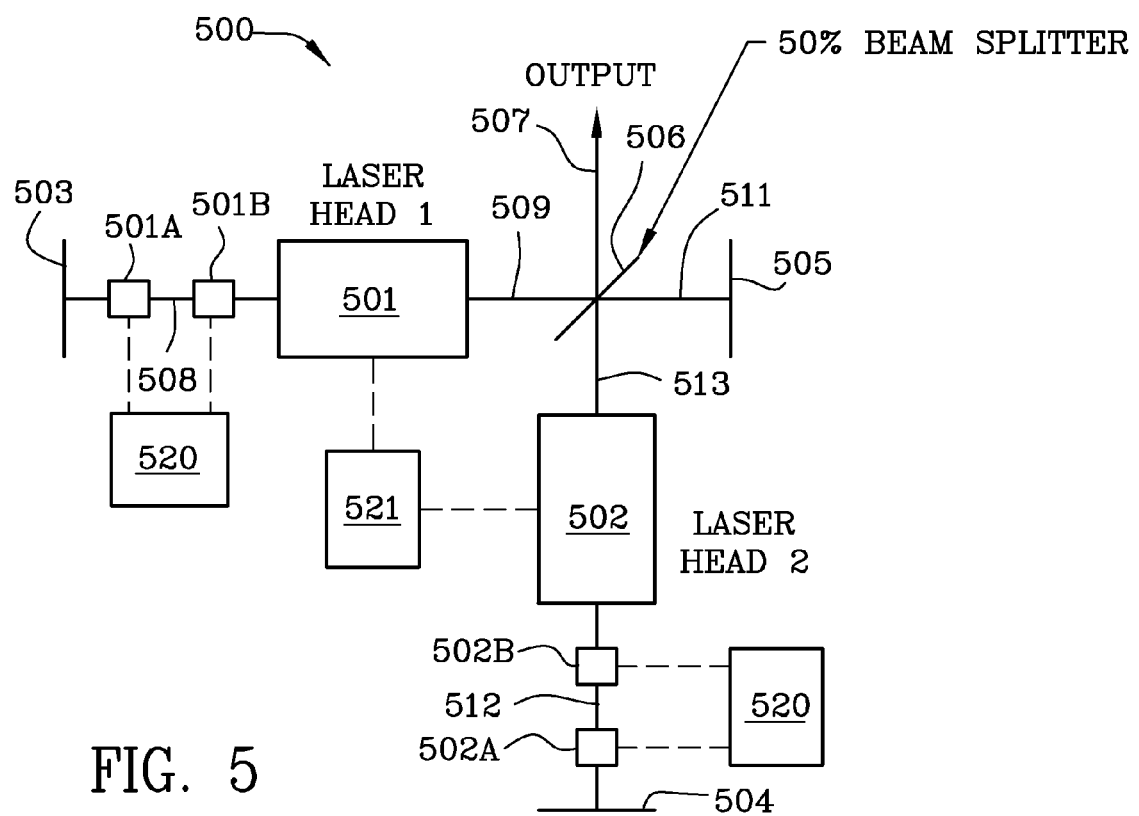
FIG. 5 is a schematic of an example of the invention illustrating laser beam combining and power scaling using two laser heads, three highly reflective mirrors, one 50% beam splitter, a laser output and vertical and horizontal Q-switches intermediate the two laser heads and their respective highly reflective mirrors.

One example of the invention is set forth in FIG. 5 and schematically depicts a novel method of laser beam combining and power scaling using three highly reflective (HR) mirrors, one 50% beam splitter and at least two Q switches. This new method produces multiple direct feedback paths for each laser head which keeps the power in each head at lower individual levels while also allowing the laser heads to be fired (pulsed) simultaneously or independently. Another example of the invention is set forth in FIG. 6 and schematically includes combining the laser beams from three laser heads (resonators). Another example of the invention is set forth in FIG. 7 illustrating schematically five or more laser beams combined together into a single beam. By controlling the phasing of the laser pulses with respect to each other, a number of features can be maximized depending on the requirements and application of the laser. The pulses can be emitted synchronously, multiplying the peak power by the number of heads in the configuration. The pulses can be emitted one after the other, increasing the pulse energy and duration without increasing the peak power. The pulses can be emitted with equal time between pulses, multiplying the repetition rate of the pulses. This cannot be done effectively using any of the current methods of laser power scaling.

FIG. 5 is a schematic of one example of the invention illustrating laser beam combining and power scaling device 500 using two laser heads 501, 502, three highly reflective mirrors 503, 504, 505, one 50% beam splitter 506, a laser output 507 and vertical 501A, 502A and horizontal 501B, 502B Q-switches intermediate the two laser heads and their respective highly reflective mirrors. Q-switches create a large (energy magnitude expressed in Joules) pulse having a short pulse width. Both laser heads 501, 502 are diode pumped (not shown).

Figure 8:
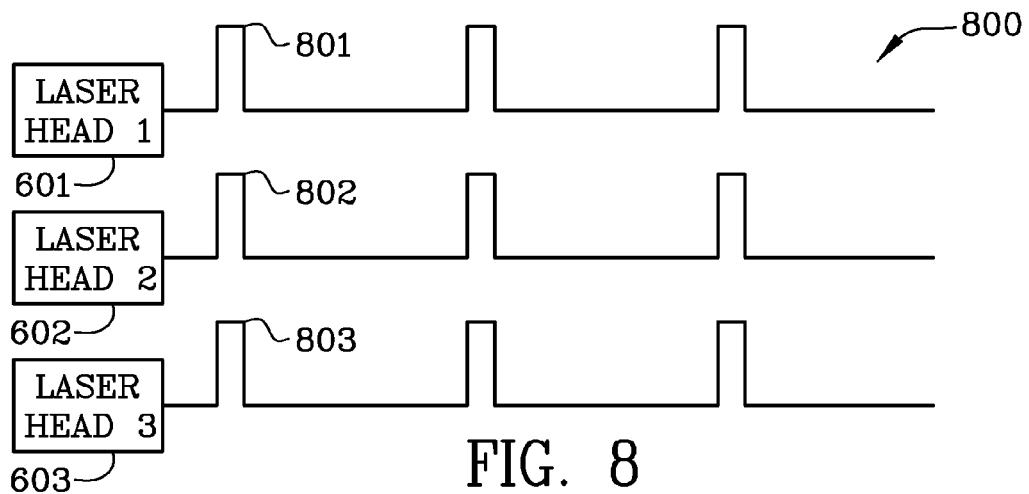
FIG. 8 is a Q-switch modulation timing chart for the three laser head configuration of FIGS. 6, 11 and 12.
Figure 9:
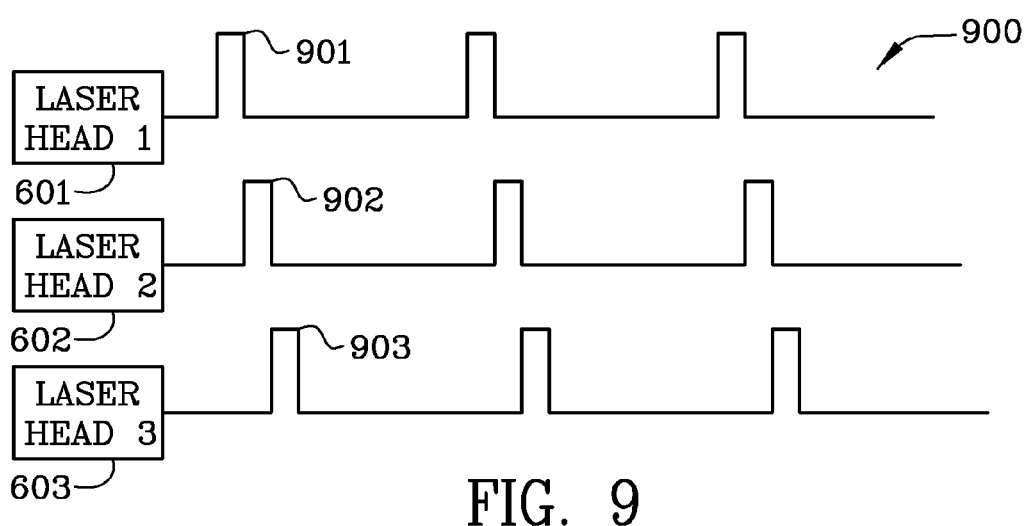
FIG. 9 is another Q-switch modulation timing chart for the three laser head configuration of FIGS. 6, 11 and 12.
Figure 10:
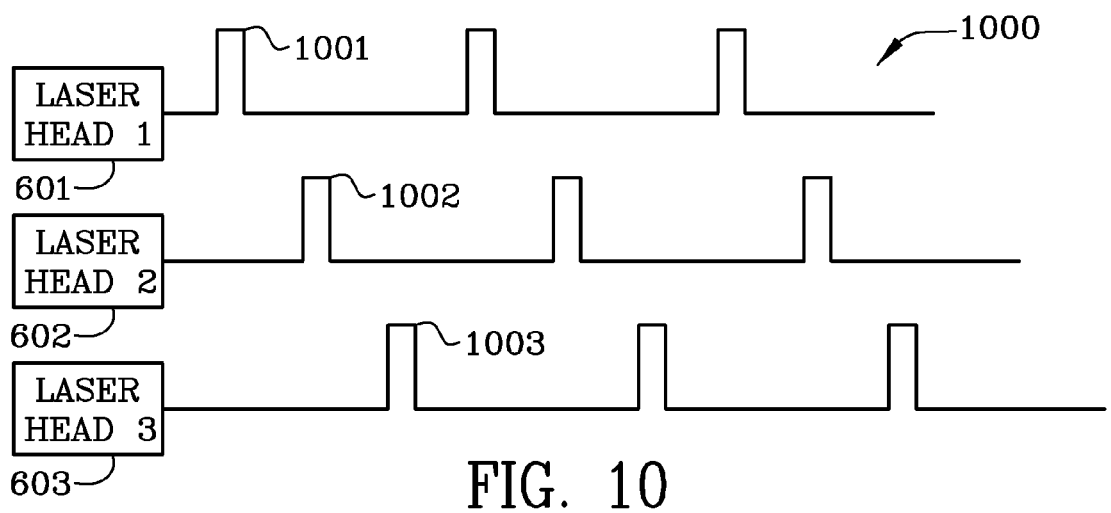
FIG. 10 is another Q-switch modulation timing chart for the three laser head configuration of FIGS. 6, 11 and 12.

Referring to FIG. 5, laser head 501 (typically an NdYAG laser head/medium) begins emission along the optical axes 508, 509 when Q-switches 501A, 501B are energized by a high control signal as illustrated in FIG. 8, 9 or 10. Q-switches 501A, 501B are water cooled acousto-optical switches made by Gooch & Housego. Q-switch 501A is a vertical Q-switch meaning that it deflects the radiation generated in the laser head vertically and Q-switch 501B is a horizontal Q-switch meaning that it deflects the radiation horizontally. Deflection of the radiation prevents lasing. Two Q-switches are employed to ensure that lasing is held off. One Q-switch could be used but it would have to be operated at higher power. Two switches are preferred as they may be run at lower power to ensure that lasing is held off. Laser head 502 (typically an NdYAG laser head/medium) begins emission along optical axes 512, 513 when Q-switches 502A, 502B are energized by a high control signal as illustrated in FIG. 8, 9 or 10. Optical axis 511 is a third optical axis and it is coincident with optical axes 508, 509.

When Q-switches 501A, 501B and 502A, 502B are actuated and permit lasing in respective laser heads 501, 502, radiation is emitted along first optical axis 509. First laser head 501 has a first optical axis 508, 509. Preferably the first laser head is diode pumped. A first highly reflective mirror 503 resides perpendicular to the first optical axis in alignment therewith behind the first laser head 501 and reflects radiation when emitted from the first laser head 501.

A first Q-switch 501A in alignment with the first optical axis 508, 509 is interposed between the first highly reflective mirror 503 and the first laser head 501. The second laser head 502 has a second optical axis 512, 513. The second laser head 502 is also diode pumped. A second highly reflective mirror 504 resides perpendicular to the second optical axis in alignment therewith behind the second laser head 502 and reflects radiation when emitted from the second laser head 502. A second Q-switch 502A in alignment with the second optical axis is interposed between the second highly reflective mirror 504 and the second laser head 502.

Still referring to FIG. 5, a third optical axis 511 is coincident with said first optical axis 508, 509. A third highly reflective mirror 505 resides perpendicular to the third optical axis in alignment therewith. The second optical axis 512, 513 perpendicularly intersects the first 508, 509 and the third 511 optical axes. A beam splitter 506 resides at the intersection of the second optical axis and the first and third optical axes. Laser output 507 has a laser output axis coincident with the second optical axis 512, 513. The first laser head emits radiation along the first axis 509 into and through the beam splitter 506. The beam splitter 506 directs a first portion of the radiation emitted from the first laser head along the third optical axis 511 and the beam splitter 506 directs a second portion of the radiation emitted from the first laser head along the laser output axis 507 coincident with the second optical axis 512, 513.

The first portion of the radiation emitted from the first laser 501 head travels along the third axis 511 and is reflected by the third highly reflective mirror 505 toward the beam splitter. The beam splitter 506 directs a first portion of the radiation emitted from the third highly reflective mirror 505 into the first laser head along the first optical axis and the beam splitter directs a second portion of the radiation emitted from the third highly reflective mirror along the second optical axis into the second laser head.

The second laser head emits radiation along the second axis into and through the beam splitter 506. The beam splitter directs a first portion of the radiation emitted from the second laser head 502 along the laser output axis 507 and the beam splitter 506 directs a second portion of the radiation emitted from the second laser head 502 along the third optical axis and into the third highly reflective mirror 505.

A first control device 520 varies the timing, frequency and duration of the control signals to the first 501A and second 502A Q-switches. A second control device 521 pumps first 501 and second 502 laser heads 100% of the time when a diode pumped system is employed. Energy is applied to the laser heads 501, 502, 100% of the time. The energy may be in the form of light emitting diodes in the case of the diode pumping or it may be in the form of incoherent light in the case of lamp pumping. The laser output 507 emits radiation from the first and second laser heads along the laser output axis.

The first 501A and second 502A Q-switches are vertical Q-switches meaning that they deflect the radiation upwardly (vertically) absent a control signal which defeats the deflection. The third Q-switch 501B is interposed in alignment with the first optical axis 508 between the first Q-switch 501A and the first laser head 501. Third Q-switch 501B is a horizontal Q-switch meaning that the radiation is deflected horizontally absent a control signal which defeats the deflection. A fourth Q-switch 502B is interposed in alignment with the second optical axis between the second Q-switch 502A and the second laser head 502. Fourth Q-switch 502B is a horizontal Q-switch meaning that the radiation is deflected horizontally absent a control signal which defeats the deflection.

As a first control example, a first control device 520 varies the timing, frequency and duration of the actuation of the first and second Q-switches by modulating the first and second Q-switches simultaneously. The control device 520 provides a short duration, high power radiation pulse in the laser output axis upon the application of control signals to the first and second Q-switches as illustrated in FIG. 8. It is not necessary to use both Q-switches 501A, 501B in the first optical axis 508, nor is it necessary to use both Q-switches 502A, 502B in the second optical axis. Application of simultaneous pulses 801, 802 to Q-switches 501A, 502A as set forth in FIG. 8 results in a high power radiation pulse which is the sum of the power produced by the first and second laser heads. FIGS. 8, 9 and 10 are examples of control algorithms which may be used and the user may employ vastly different control algorithms depending on the use of the laser.

When two Q-switches are used in each optical axis, they are always pulsed together as if they were one Q-switch.

As a second alternative control example, the first control device 520 varies the timing, frequency and duration of the actuation of the first and second Q-switches by modulating the first and second Q-switches sequentially without any time between pulses. The control device 520 provides a short duration, high power radiation pulse in the laser output axis 507. Application of sequential pulses 901, 902 without any time between them 901, 902 to Q-switches 501A, 502A as set forth in FIG. 9 results in a high power radiation pulse which is substantially equal to the individual power of the first and second laser heads with the pulse being twice as long as the first example stated above wherein the Q switches are modulated simultaneously.

As a third alternative control example, the first control device 520 varies the timing, frequency and duration of the actuation of the first and second Q-switches by modulating the first and second Q-switches sequentially but with time gaps therebetween. The control device 520 provides a series of short duration temporally spaced apart, high power radiation pulses in the laser output axis. Application of sequential pulses 1001, 1002 spaced apart by time gaps therebetween to Q-switches 501A, 502A as set forth in FIG. 10 results in high power radiation pulses substantially equal to the individual power of the first and second laser heads spaced apart in time.

Figure 6:
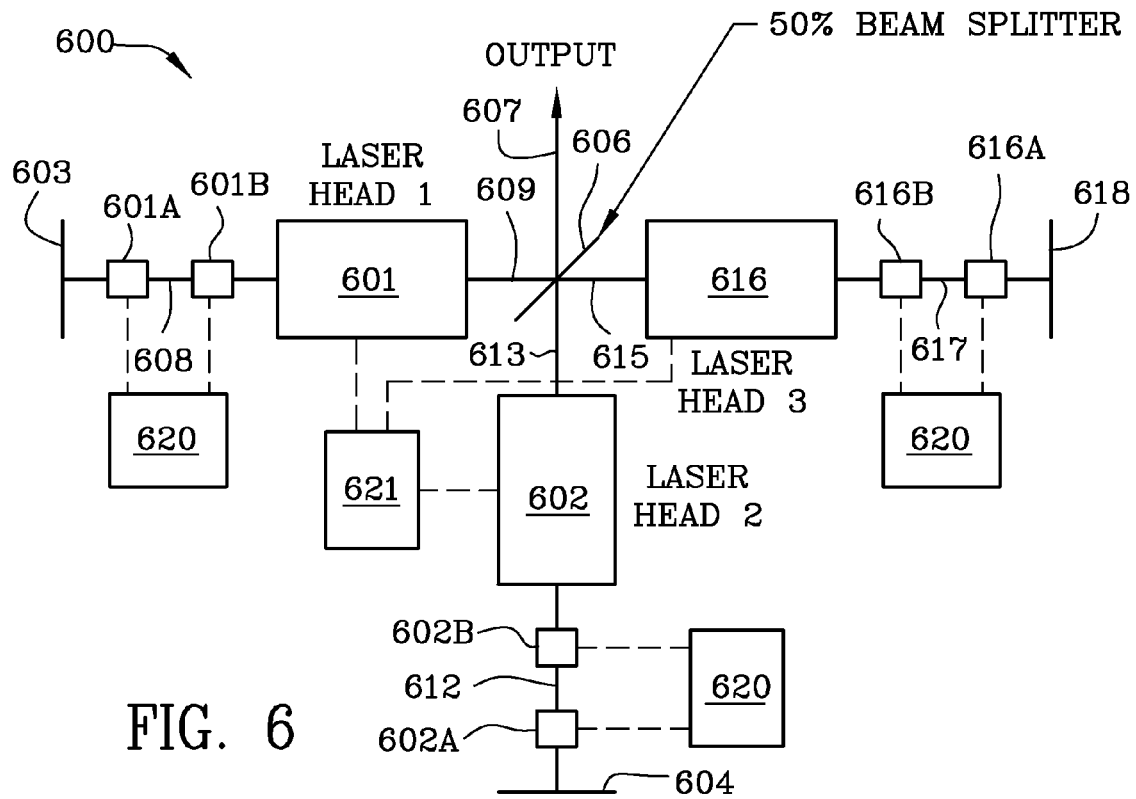
FIG. 6 is a schematic of another example of the invention illustrating laser beam combining and power scaling using three laser heads, three highly reflective mirrors, one 50% beam splitter, a laser output, and vertical and horizontal Q-switches intermediate the three laser heads and their respective highly reflective mirrors.
Figure 7:
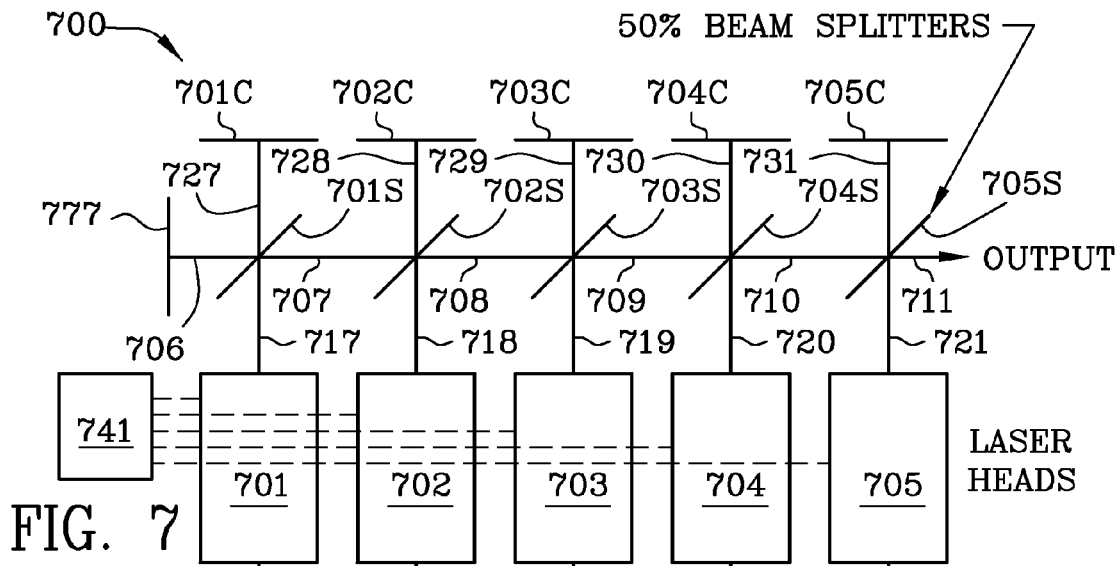
FIG. 7 is a schematic of another example of the invention illustrating laser beam combining and power scaling using five laser heads, eleven highly reflective mirrors, five 50% beam splitters, a laser output, and vertical and horizontal Q-switches intermediate the three laser heads and their respective highly reflective mirrors.

FIG. 6 is a schematic 600 of another example of the invention illustrating a laser beam combining and power scaling using three laser heads 601, 602, 603, three highly reflective mirrors 603, 604, 618, one 50% beam splitter 606, a laser output 607, and vertical 601A, 602A, 616A and horizontal 601B, 602B, 616B Q-switches intermediate the three laser heads and their respective highly reflective mirrors 603, 604, 618.

Figure 6A:
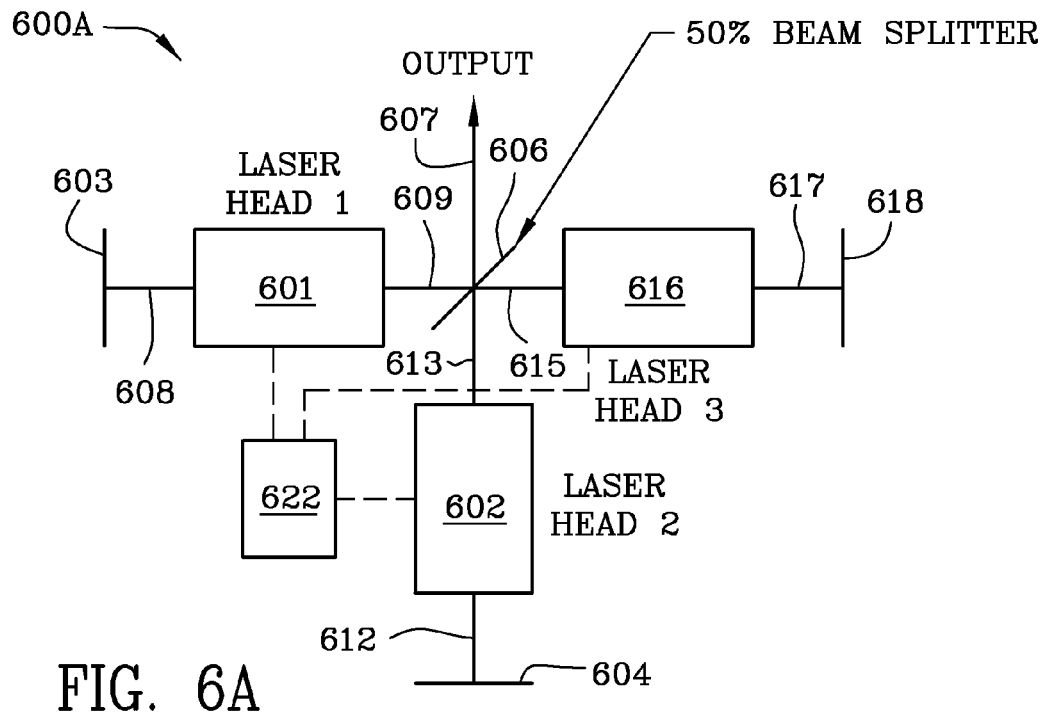
FIG. 6A is a schematic of another example of the invention illustrating laser beam combining and power scaling using three laser heads, three highly reflective mirrors, one 50% beam splitter, and a laser output.

FIG. 6A is a schematic 600A of another example of the invention illustrating a laser beam combining and power scaling using three laser heads, three highly reflective mirrors, one 50% beam splitter, and a laser output without the Q-switches. The examples set forth in FIGS. 6A and 7A may be used with different performance characteristics as the Q-switches provide short or narrow pulse widths and higher energy pulses as compared to un-switched laser heads. The q-switched beam combining system is used to narrow the optical pulse width at a given power level compared to a single laser at the same given power level.

Figure 7A:
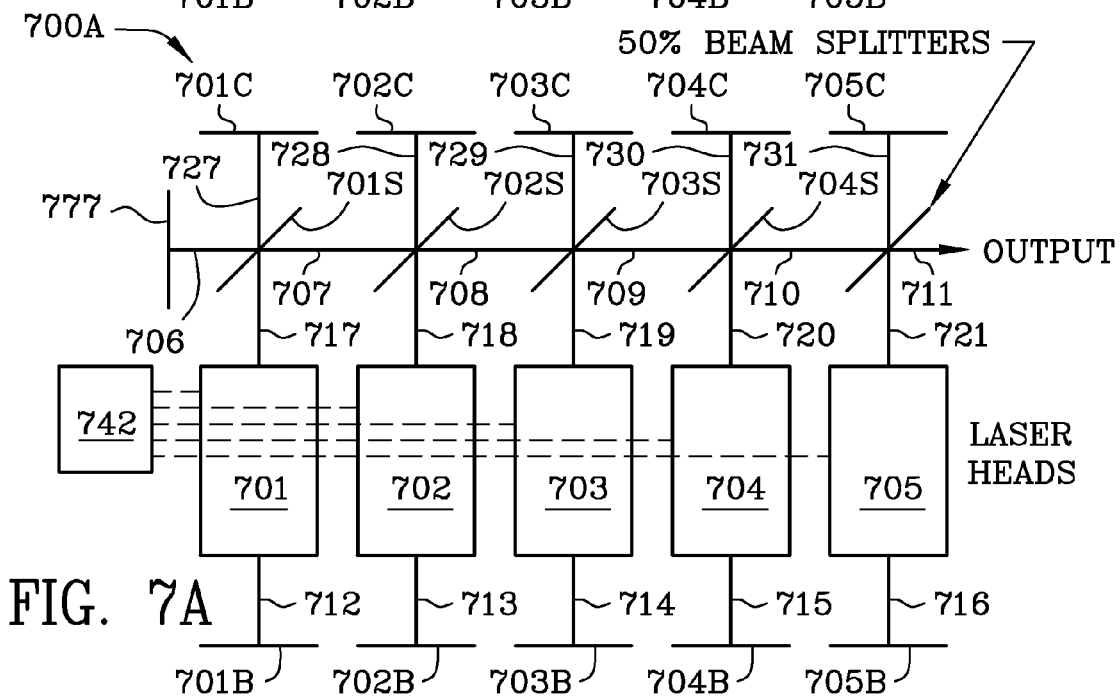
FIG. 7A is a schematic of another example of the invention illustrating laser beam combining and power scaling using five laser heads, eleven highly reflective mirrors, five 50% beam splitters, a laser output, and vertical and horizontal Q-switches intermediate the three laser heads and their respective highly reflective mirrors.

In the examples of FIGS. 6A, and 7A which do not have the Q-switches, a current pulse may be applied to the laser heads.

Current pulse controlled lasers are limited to a duty cycle that depends on the specific system. In the example of FIG. 6A, reference numeral 622 is used to denote current pulse control of the laser heads. The current pulse control may be applied simultaneously to all the laser heads or it may be applied sequentially with no time gaps between the sequential firing of the lasers. Or, the lasers may be fired sequentially with time gaps therebetween. Different controls may be applied to the laser heads illustrated in FIG. 6A. For instance, the laser heads may be continuously energized and the output of FIG. 6A may be the sum of each of the three laser heads, 601, 602 and 616. Each of the laser heads may be operated, for instance, at fractional power enabling better control of the system. If a single laser head is used at full power, increased stress and heating on the optical components substantially lowers the quality of the laser beam creating lensing and optical waists that shift throughout the system and severely limits the power scaling achievable.

Another example of the laser beam combining and power scaling device is set forth in FIG. 6 and includes first 601, second 602 and third 616 laser heads. First laser head 601 has a first optical axis 608, 609 and is preferably diode pumped. Alternatively, laser head 601 may be lamp pumped. A first highly reflective mirror 603 resides perpendicular to the first optical axis 608, 609 in alignment therewith behind the first laser head 601 reflecting radiation when emitted from the first laser head. A first Q-switch 601A is interposed in alignment with the first optical axis 608, 609 between the first highly reflective mirror 603 and the first laser head 601.

The second laser head 602 has a second optical axis 612, 613 and the laser head is preferably diode pumped. A second highly reflective mirror 604 resides perpendicular to the second optical axis 612, 613 in alignment therewith behind the second laser head reflecting radiation when emitted from the second laser head 602. A second Q-switch 602A is interposed in alignment with the second optical axis between the second highly reflective mirror and the first laser head.

The third laser head 616 has a third optical axis 615, 617, and the third laser head is diode pumped. A third highly reflective mirror 618 resides perpendicular to the third optical axis in alignment therewith behind the third laser head 616. A third Q-switch 616A in alignment with the third optical axis 615, 617 is interposed between the third highly reflective mirror and the third laser head. The first and third optical axes are coincident.

The second optical axis 612, 613 perpendicularly intersects the first and third optical axes 608, 609; 615, 617. A beam splitter 606 resides at the intersection of the second optical axis 612, 613 and the first and third optical axes. A laser output 607 has a laser output axis coincident with the second optical axis. The first laser head 601 emits radiation along the first optical axis 609 into and through the beam splitter 606, the beam splitter directs a first portion of the radiation emitted from the first laser head 601 into the third laser head 616 along the third optical axis 615. The beam splitter directs a second portion of the radiation emitted from the first laser head along the laser output axis 607 coincident with the second optical axis 613. The third laser head emits radiation along the third axis 615 into and through the beam splitter 606. The beam splitter directs a first portion of the radiation emitted from the third laser head 616 into the first laser head 601 along the first optical axis 609 where some of the radiation passes therethrough and is reflected from highly reflective mirror 618. The beam splitter directs a second portion of the radiation emitted from the third laser head 616 along the second optical axis 613 into the second laser head 602 where some of the radiation passes therethrough and is reflected from highly reflective mirror 603.

Still referring to FIG. 6, the second laser head 602 emits radiation along the second axis into and through the beam splitter 606. The beam splitter directs a first portion of the radiation emitted from the second laser head along the laser output axis 607. The beam splitter directs a second portion of the radiation emitted from the second laser head 602 along the third optical axis 615 and into the third laser head 618 where some of the radiation passes therethrough and is reflected from highly reflective mirror 618.

A first control device 620 varies the timing, frequency and duration of control signals to the first 601A, second 602A and third 616A Q-switches. A second control device 621 pumps the first 601, second 602 and third 616 laser heads continuously, 100% of the time. The laser output 607 emits radiation from the first, second and third laser heads along the laser output axis.

Figure 11:
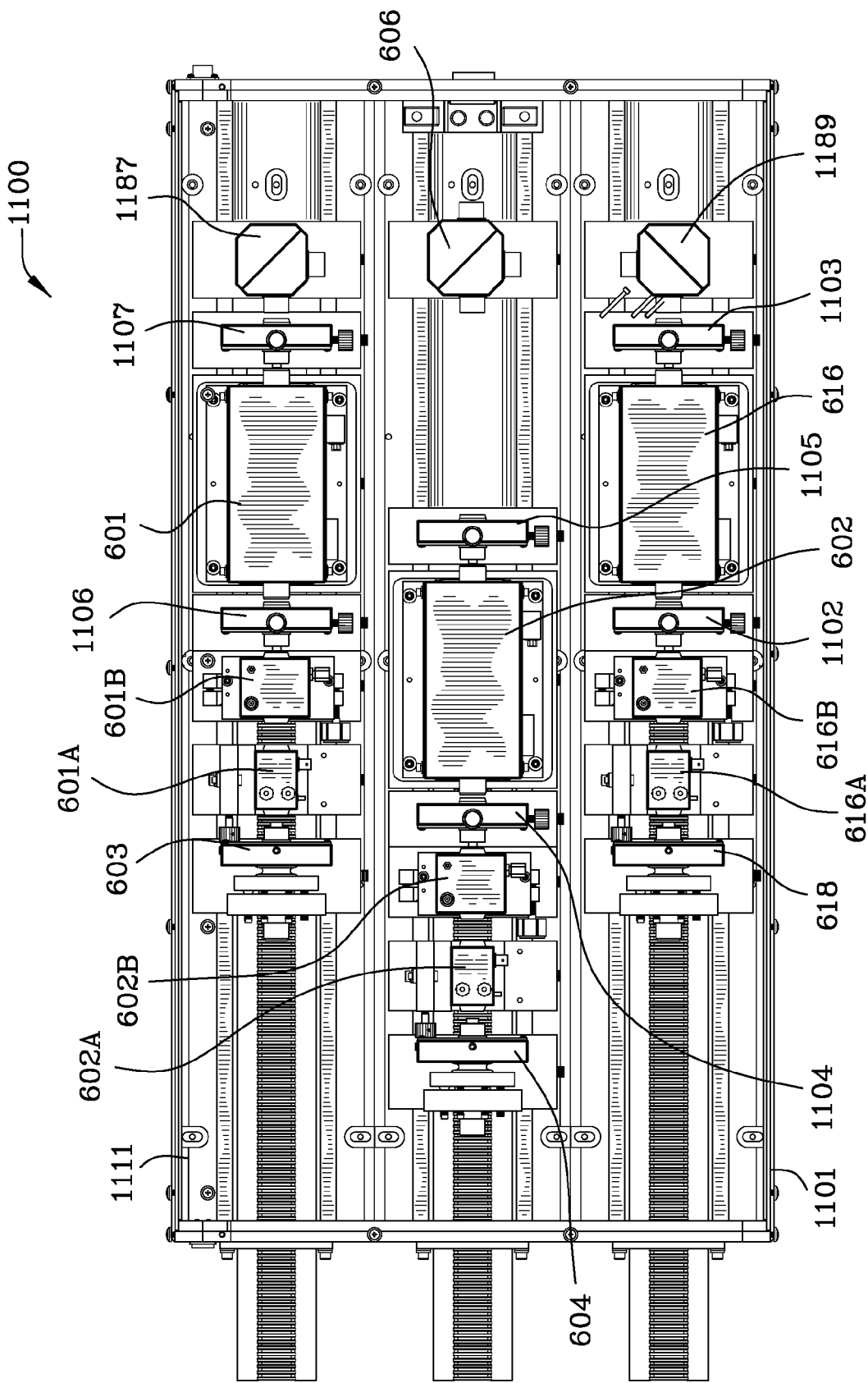
FIG. 11 is a top view of the three laser head configuration of FIG. 6.
Figure 12:
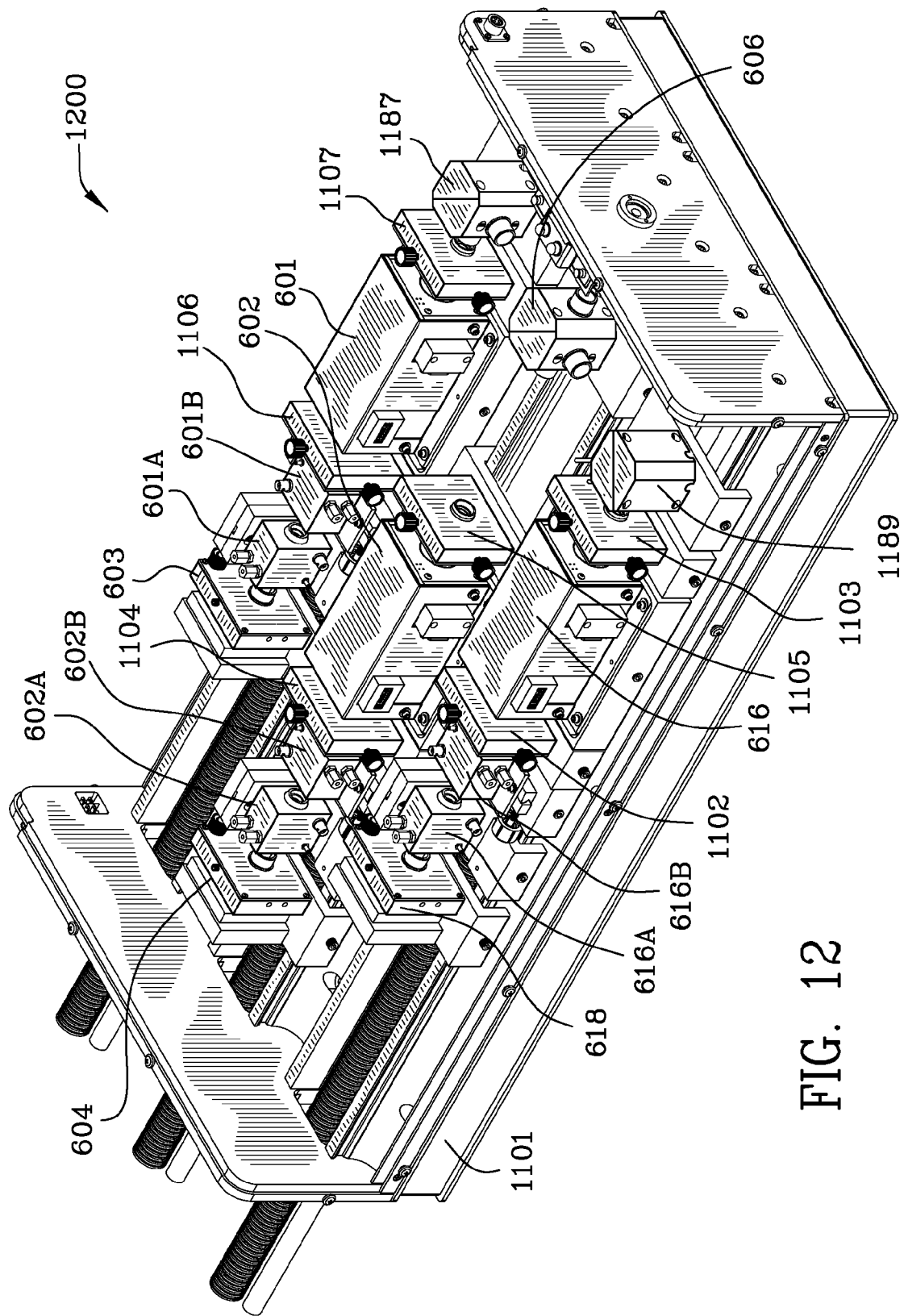
FIG. 12 is a perspective view of the three laser head configuration of FIG. 6.

Still referring to FIG. 6, one operational example (the first example pertaining to FIG. 6) of the first control device 620 is given wherein the timing, frequency and duration of the actuation of the first, second and third Q-switches is varied by modulating the first, second and third Q-switches simultaneously. The first control device provides a short duration, high power radiation pulse in the laser output axis 607, and, the high power radiation pulse is the sum of the energy and power produced by the first 601, second 602 and third 616 laser heads. Referring to FIG. 8, a Q-switch modulation timing chart for the three laser head configuration of FIGS. 6, 11 and 12 is disclosed wherein all three laser heads are fired simultaneously. As stated above, FIG. 8 is applicable to the operation of a two headed laser system and illustrates the simultaneous occurrence of control impulses to the Q-switches to permit lasing. It will be noticed that FIG. 6 illustrates two sets of Q-switches in the first 608, second 612 and third 617 optical axes. Q-switches 601A, 602A and 616A are vertical Q-switches meaning that the radiation beam is deflected vertically. These vertical acousto-optical Q-switches alone are sufficient to hold off lasing although it is preferred to include horizontal Q-switches 601B, 602B and 616B in each of the optical axes as well to reduce the power supplied to each Q-switch.

Still referring to FIG. 6, another operational example (the second example pertaining to FIG. 6) of the first control device is given wherein the timing, frequency and duration of the actuation of the first and second Q-switches is varied by modulating the first, second and third Q-switches sequentially without any time between pulses. In this example as illustrated in FIG. 9, the control signals 901, 902, and 903 defeat the Q-switches halting deflection of the radiation and providing a short duration, high power optical radiation pulse in the laser output axis. The short duration high power optical radiation pulse is substantially equal to the individual energy and power of the first, second and third laser heads. The short duration high power pulse of the example of FIG. 9 will be substantially three times as long as the first operational example.

Still referring to FIG. 6, another operational example (the third example pertaining to FIG. 6) of the first control device is given wherein the timing, frequency and duration of the actuation of the first, second, and third Q-switches is varied by modulating the first, second, and third Q-switches sequentially but with time gaps therebetween. The first control device provides a series of short duration temporally spaced apart, high power radiation pulses in the laser output axis. The high power optical radiation pulses are substantially equal in magnitude to the individual power of the first, second, and third laser heads. The control algorithm applied to a single Q-switch in each optical axis, for instance Q-switches 601A, 602A and 616A if they were used alone, is given in FIG. 10 by reference numerals 1001, 1002 and 1003. These signals as represented by reference numerals 1001, 1002, and 1003 are sequential and are spaced apart which will permit the laser to essentially provide a stitched output if, for example, the laser were to be used for this purpose.

Referring to FIG. 6A, if current pulse control is applied to the laser heads and if the frequency of the control impulses set forth in FIG. 10 were to increase substantially, a pseudo continuous wave would be produced by a sufficiently high repetition rate.

Q-switched performance of the example illustrated in FIG. 6, at 10 kHz, provides average power of 660 W (Watts), pulse energy of 66 mJ (milli Joules), nominal pulse width of 75 ns (nanoseconds) and peak pulse power of approximately 880 kW (kilo watts).

Operation at 15 kHz yields average power of 700 W (Watts), pulse energy of 47 mJ (milli Joules), nominal pulse width of 100 ns (nanoseconds) and peak pulse power of approximately 470 kW (kilo watts).

Operation at 20 kHz yields average power of 700 W (Watts), pulse energy of 35 mJ (milli Joules), nominal pulse width of 110 ns (nanoseconds) and peak pulse power of approximately 318 kW (kilo watts).

Figure 6B:
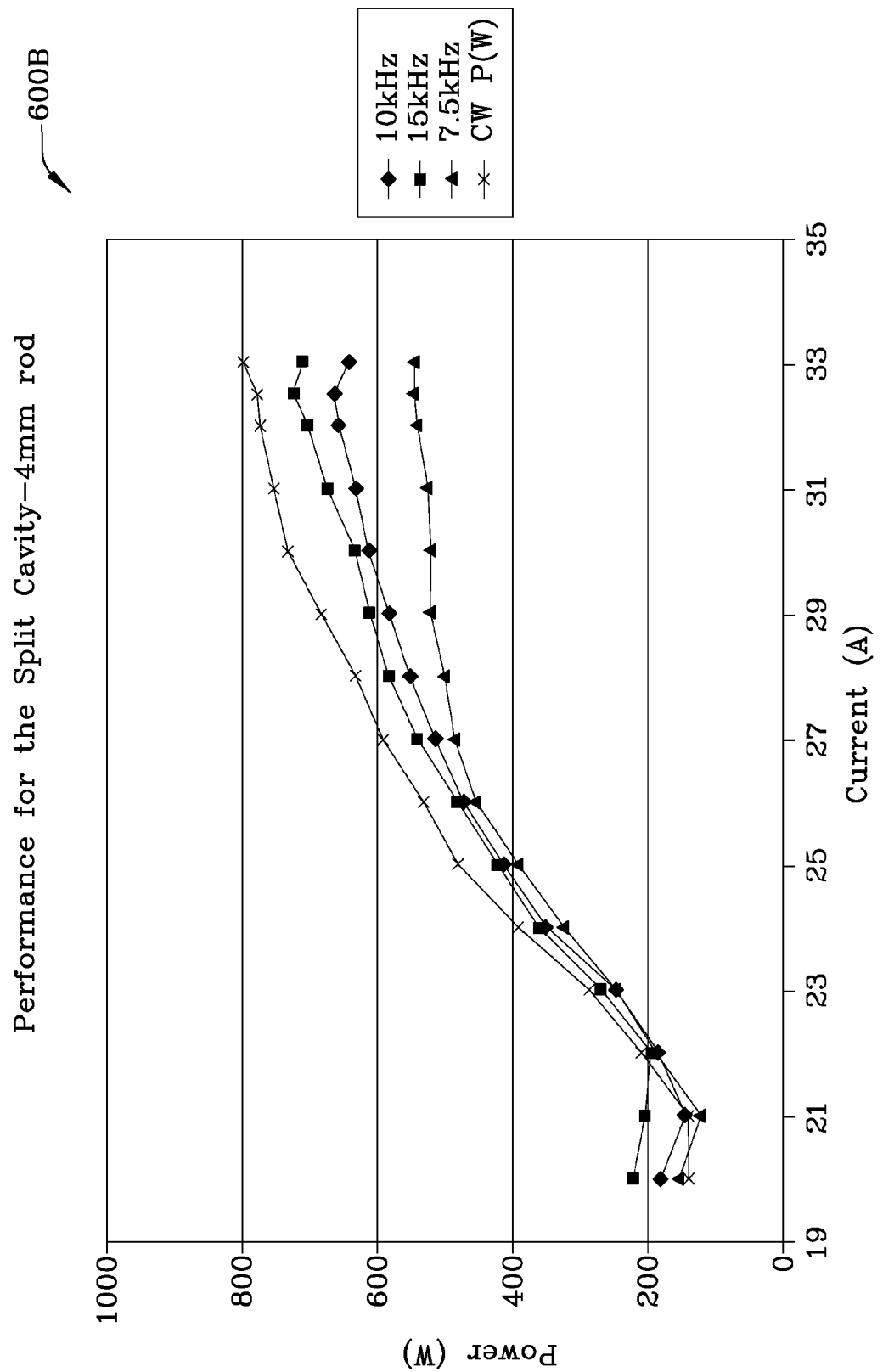
FIG. 6B is a plot of an optical power output versus current supplied to the laser heads.

FIG. 6 by way of example employs diode pumped NdYAG laser heads. Thirty six (36) diodes rated at 40 W are used and are pumped at a wavelength of 808 nm. Radio frequency power up to 100 W is applied to water cooled acousto optical Q switches. Q switch actuation (RF off time) is typically 8 µs. FIG. 6B illustrates graphically the total power delivered (laser output) simultaneously from the three head laser of FIG. 6 plotted against the current supplied to the diodes. Testing performed on the three headed laser at 1064 nm was performed having a spot size of 4 mm with a divergence of 11.4 mr (milli-radians).

FIG. 7 is a schematic 700 of another example of the invention illustrating laser beam combining and power scaling using five laser heads 701, 702, 703, 704, 705, eleven highly reflective mirrors 701C, 702C, 703C, 704C, 705C, 701B, 702B, 703B, 704B, 705B, 777, five 701S, 702S, 703S, 704S, 705S, 50% beam splitters, a laser output 711, and vertical 701A, 702A, 703A, 704A, 705A and horizontal 701D, 702D, 703D, 704D, 705D Q-switches intermediate the five laser heads and their respective highly reflective mirrors 701B, 702B, 703B, 704B, 705B.

FIG. 7A is a schematic 700A of another example of the invention illustrating laser beam combining and power scaling using five laser heads, eleven highly reflective mirrors, five 50% beam splitters, a laser output. The example of FIG. 7A may be used with laser heads that are pumped with current pulses as described in connection with FIG. 6A above.

A laser beam combining and power scaling device 700 is illustrated in FIG. 7 and comprises a plurality of laser heads arranged in parallel. The plurality of laser heads 701, 702, 703, 704, 705 emit radiation. The lasers are preferably diode pumped and the preferred laser medium is NdYAG. A plurality of respective optical axes (712, 717—first optical axis;

713, 718—second optical axis; 714, 719—third optical axis; 715, 720—fourth optical axis and 716, 721—fifth optical axis) are aligned with respective ones of the plurality of laser heads. A plurality of first highly reflective mirrors 701B, 702B, 703B, 704B, 705B resides perpendicularly with respective ones of the plurality of optical axes 712, 713, 714, 715 and behind respective ones of the plurality of the laser heads. A plurality of second highly reflective mirrors 701C, 702C, 703C, 704C, 705C reside perpendicularly with respective ones of the plurality of optical axes 727, 728, 729, 730, 731 which are coincident with the optical axis of the laser heads.

Still referring to FIG. 7, a plurality of beam splitters 701S, 702S, 703S, 704S, 705S are arranged at an incidence angle (typically 45°) with respect to respective ones of the optical axes 717, 718, 719, 720, 721 and reside intermediate the respective ones of the plurality of laser heads and the plurality of second highly reflective mirrors 701C, 702C, 703C, 704C, 705C. A common laser output axis 711 comprises output optical axes 706, 707, 708, 709, 710, the output optical axes 707, 708, 709 and 710 residing intermediate the beam splitters as illustrated in FIGS. 7 and 7A. The plurality of beam splitters direct respective first portions of radiation emitted from the plurality of laser heads along the common laser output axis 706, 707, 708, 709, 710, 711. The plurality of beam splitters 701S, 702S, 703S, 704S, 705S direct respective second portions of the radiation emitted from the plurality of laser heads through the beam splitter along the respective ones 727, 728, 729, 730, 731 of the optical axes toward the plurality of second highly reflective mirrors 701C, 702C, 703C, 704C, 705C.

Still referring to FIG. 7, a common output axis highly reflective mirror 777 resides perpendicularly along the common laser output axis 706, 707, 708, 709, 710, 711. The plurality of second highly reflective mirrors 701C, 702C, 703C, 704C, 705C reside perpendicularly with respect to respective ones of the plurality of optical axes 727, 728, 729, 730, 731 reflecting the respective plurality of second portions of the radiation emitted from the plurality of laser heads 701, 702, 703, 704, 705 along the respective ones of the optical axes 727, 728, 729, 730, 731 toward the respective ones of the beam splitters. The plurality of beam splitters direct respective first portions of radiation emitted from the respective ones of the plurality of second highly reflective mirrors 701C, 702C, 703C, 704C, 705C along the common output axis 706, 707, 708, 709, 710, 711 toward the common output axis highly reflective mirror 777 residing perpendicularly to the common output axis. The plurality of beam splitters direct respective second portions of radiation emitted from the respective ones of the plurality of second highly reflective mirrors through the beam splitter toward the respective ones of the plurality of laser heads 701, 702, 703, 704, 705.

The common output axis mirror 777 reflects the respective first portions of radiation received from the plurality of second highly reflective mirrors toward the plurality of beam splitters 701S, 702S, 703S, 704S, 705S. The plurality of beam splitters direct a plurality of first portions of radiation from the common output axis highly reflective mirror 777 through the beam splitters and along the common laser output axis 706, 707, 708, 709, 710, 711. As stated before, the beam splitters also direct the first portions of radiation emitted from the plurality of laser heads along the common laser output axis. Common output axis 706, 707, 708, 709, 710, and 711 carries coherent light (radiation) which is emitted as indicated in FIG. 7. Further, the plurality of beam splitters direct a plurality of second portions of radiation from the common output axis highly reflective mirror 777 toward the second highly reflective mirrors 701C, 702C, 703C, 704C, 705C along said respective ones of said optical axes 727, 728, 729, 730, 731.

Still referring to FIGS. 7 and 7A, a plurality of first acousto-optical Q-switches 701A, 702A, 703A, 704A, 705A reside in respective ones of the plurality of the optical axes 712, 713, 714, 715, 716 between the respective ones of the laser heads 701, 702, 703, 704, 705 and the plurality of the first highly reflective mirrors 701B, 702B, 703B, 704B, 705B. The first Q-switches are vertical Q-switches. A plurality of second acousto-optical Q-switches 702D, 703D, 704D, 705D reside in respective ones of the plurality of the optical axes between the plurality of first Q-switches and the respective ones of the laser heads. The plurality of second Q-switches are horizontal Q-switches. A first control device 740 varies the timing, frequency and duration of control signals to the first and second Q-switches. A second control device 741 applies constant direct current pumping of the laser heads.

Still referring to FIG. 7, one exemplary mode (first example) of the first control device varies the timing, frequency and duration of the actuation of the first and second Q-switches and modulates the Q-switches simultaneously for all of the laser heads. See, FIG. 8 as described above in connection with the combination of 2 and 3 laser heads. In this example, a plurality of control signals are necessary, one for each laser head. Simultaneous application of control signals to the Q-switch of all laser heads provides a short duration, high power radiation pulse in the laser output axis. The high power radiation pulse is the sum of the energy power produced by all of the laser heads.

Still referring to FIG. 7, another exemplary mode (second example) of the first control device 740 varies the timing, frequency and duration of the actuation of the switches by modulating the Q-switches sequentially without any time between pulses. In this example, each of the laser heads fire in sequence beginning with 701, 702, 703 etc. This control algorithm as expressed in FIG. 9 provides a short duration, high power radiation pulse in the laser output axis. The magnitude of the high energy high power radiation pulse is substantially equal to the individual energy and power of the individual laser heads. In other words, this example provides a lower magnitude pulse than the first example but the pulse would be longer by the number of laser heads.

Still referring to FIGS. 7 and 7A, another exemplary mode (third example) of the first control device varies the timing, frequency and duration of the actuation of the Q-switches by modulating the Q-switches sequentially but with time gaps therebetween. This example provides a series of short duration temporally spaced apart, high power radiation pulses in the laser output axis. The magnitude of the high power radiation pulses are substantially equal in energy and power to the individual energy and power of the individual laser heads.

In the example of FIG. 7A, reference numeral 742 denotes application and control of a current pulse to the parallel laser heads 701, 702, 703, 704 and 705. The current pulse control 742 may be applied simultaneously to all the parallel laser heads. Alternatively, current pulse control may be sequenced such that each of the laser heads are fired sequentially. Still alternatively, current pulse control may be sequenced such that the current pulses are spaced apart in time.

FIG. 8 is a Q-switch modulation timing chart of the control device 620 for the three laser head configuration of FIGS. 6, 11 and 12. Impulse 801 to Q-switch occurs simultaneously with impulses 802 and 803 which then removes the deflection of laser beam. If two Q-switches are used per laser head then the control impulses actuate both the vertical and horizontal Q-switches simultaneously.

FIG. 9 is another Q-switch modulation timing chart of the control device 620 for the three laser head configuration FIGS. 6, 11 and 12. Reference numeral 901 is a sequential impulse to Q-switch removing deflection of the laser beam of the first laser head followed by sequential impulse 902 to another Q-switch for removing deflection of the laser beam in the second laser head following impulse 901. Similarly, reference numeral 903 is a sequential impulse to Q-switch removing deflection of the laser beam for the third laser head.

FIG. 10 is another Q-switch modulation timing chart for the three laser head configuration of FIGS. 6, 11 and 12. Reference numeral 1001 is a sequential impulse to the first Q-switch removing deflection of the laser beam followed by the spaced apart sequential impulse 1002 to the Q-switch removing deflection of laser beam for the second laser head followed by sequential impulse 1003 to the Q-switch removing deflection of laser beam for the third laser head. Each of the sequenced impulses is spaced apart in time.

If current pulsed control of the laser is employed and if the frequency of operation and timing of the control channels on a laser head by laser head basis is increased and accurately controlled by the control device 622, then the operation of the laser results in a pseudo continuous wave.

FIG. 11 is a top view 1100 of the three laser head configuration of FIG. 6. The laser heads, the Q-switches and the beam splitter as discussed above are all illustrated in FIG. 11. FIG. 11 conserves space through the use of folding mirrors 1187, 1189. Apertures 1102, 1103, 1104, 1105, 1106, 1107 are used as mode control devices producing higher quality beams. The mounting frame is denoted by reference numeral 1101 and the side of the frame is denoted by reference numeral 1111.

FIG. 12 is a perspective view 1200 of the three laser head configuration of FIG. 6. 1200—perspective view corresponding to the schematic view of FIG. 6

Figure 13:
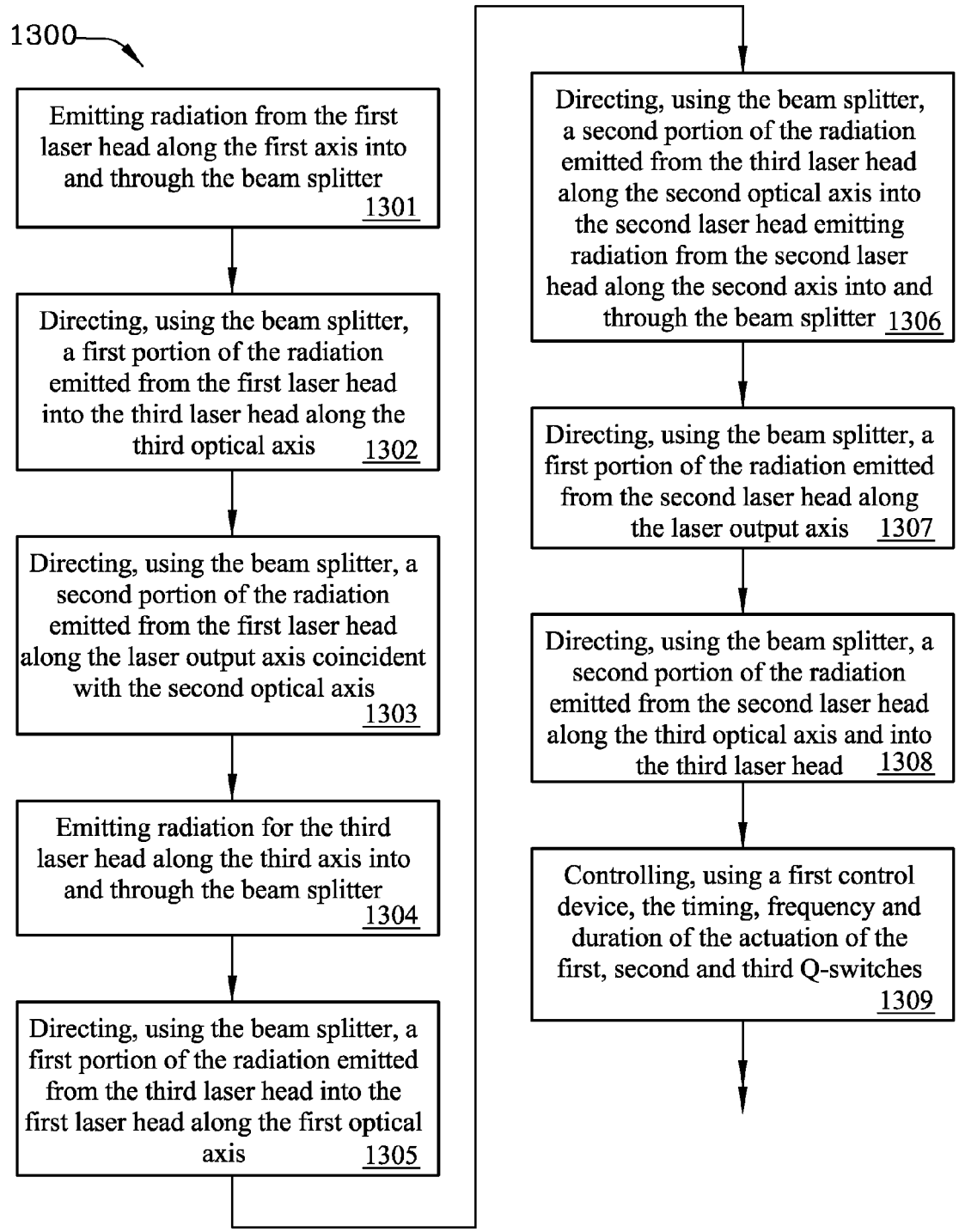
FIGS. 13 and 13A are a schematic illustration of one exemplary method of laser beam combining and power scaling using first, second and third laser heads having first, second and third optical axes.
Figure 13A:
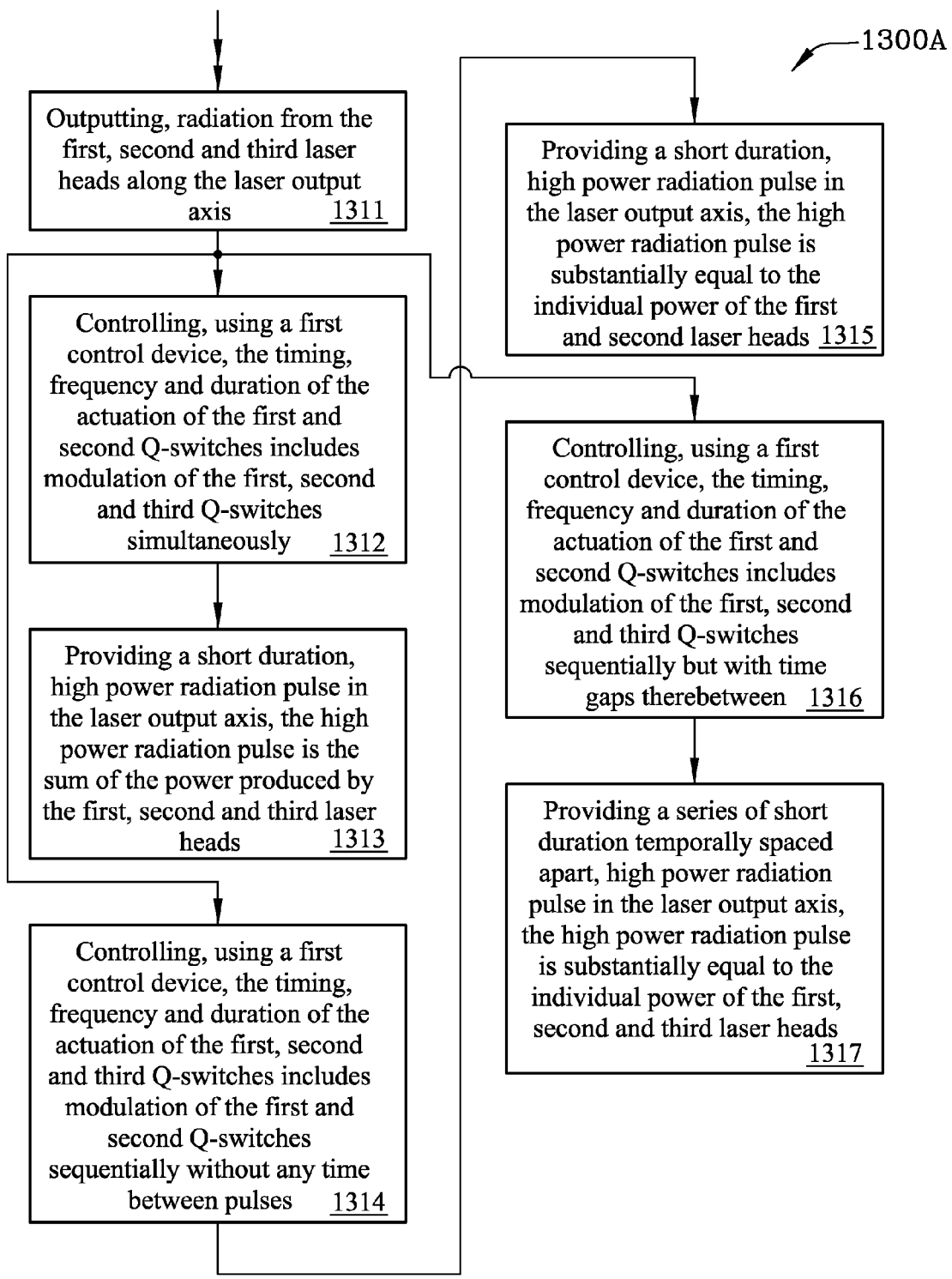

One exemplary method as set forth in FIG. 13 utilizes: a first highly reflective mirror residing perpendicular to the first optical axis in alignment therewith behind the first laser head reflecting radiation when emitted from the first laser head, a first Q-switch in alignment with the first optical axis interposed between the first highly reflective mirror and the first laser head, a second highly reflective mirror residing perpendicular to the second optical axis in alignment therewith behind the second laser head reflecting radiation when emitted from the second laser head; a second Q-switch in alignment with the second optical axis interposed between the second highly reflective mirror and the second laser head, a third highly reflective mirror residing perpendicular to the third optical axis in alignment therewith behind the third laser head, a third Q-switch in alignment with the third optical axis interposed between the third highly reflective mirror and the third laser head, the first and third optical axes being coincident, the second optical axis perpendicularly intersecting the first and the third optical axes, a beam splitter residing at the intersection of the second optical axis and the first and third optical axes, a laser output, the laser output having a laser output axis, the laser output axis being coincident with the second optical axis, and, a first control device.

The method as illustrated 1300 in FIG. 13 comprises the steps of: emitting radiation from the first laser head along the first axis into and through the beam splitter—1301; directing, using the beam splitter, a first portion of the radiation emitted from the first laser head into the third laser head along the third optical axis—1302; directing, using the beam splitter, a second portion of the radiation emitted from the first laser head along the laser output axis coincident with the second optical axis—1303; emitting radiation from the third laser head along the third axis into and through the beam splitter—1304; directing, using the beam splitter, a first portion of the radiation emitted from the third laser head into the first laser head along the first optical axis—1305; directing, using the beam splitter, a second portion of the radiation emitted from the third laser head along the second optical axis into the second laser head emitting radiation from the second laser head along the second axis into and through the beam splitter—1306; directing, using the beam splitter, a first portion of the radiation emitted from the second laser head along the laser output axis—1307; directing, using the beam splitter, a second portion of the radiation emitted from the second laser head along the third optical axis and into the third laser head—1308; controlling, using a first control device, the timing, frequency and duration of the actuation of the first, second and third Q-switches—1309; and, outputting, radiation from the first, second and third laser heads along the laser output axis—1311.

Alternatively, the method may include controlling, using the first control device, and varying the timing, frequency and duration of the actuation of the first, second and third Q-switches, includes modulating the first, second and third Q-switches simultaneously—1312. This provides a short duration, high power radiation pulse in the laser output axis. The high power radiation pulse is the sum of the power produced by the first, second and third laser heads—1313.

Still alternatively, the method may include controlling, using the first control device, and varying the timing, frequency and duration of the actuation of the first, second and third Q-switches by modulating the first, second and third Q-switches sequentially without any time between pulses—1314. This provides a short duration, high power radiation pulse in the laser output axis, the high power radiation pulse is substantially equal to the individual power of the first, second and third laser heads—1315.

Still alternatively, the method may include controlling, using the first control device, and varying the timing, frequency and duration of the actuation of the first, second and third Q-switches by modulating the first, second and third Q-switches sequentially, but with time gaps therebetween—1316. This provides a series of short duration temporally spaced apart, high power radiation pulses in the laser output axis. Each of the high power radiation pulses is substantially equal to the individual power of the first, second and third laser heads—1317.

Figure 14A:
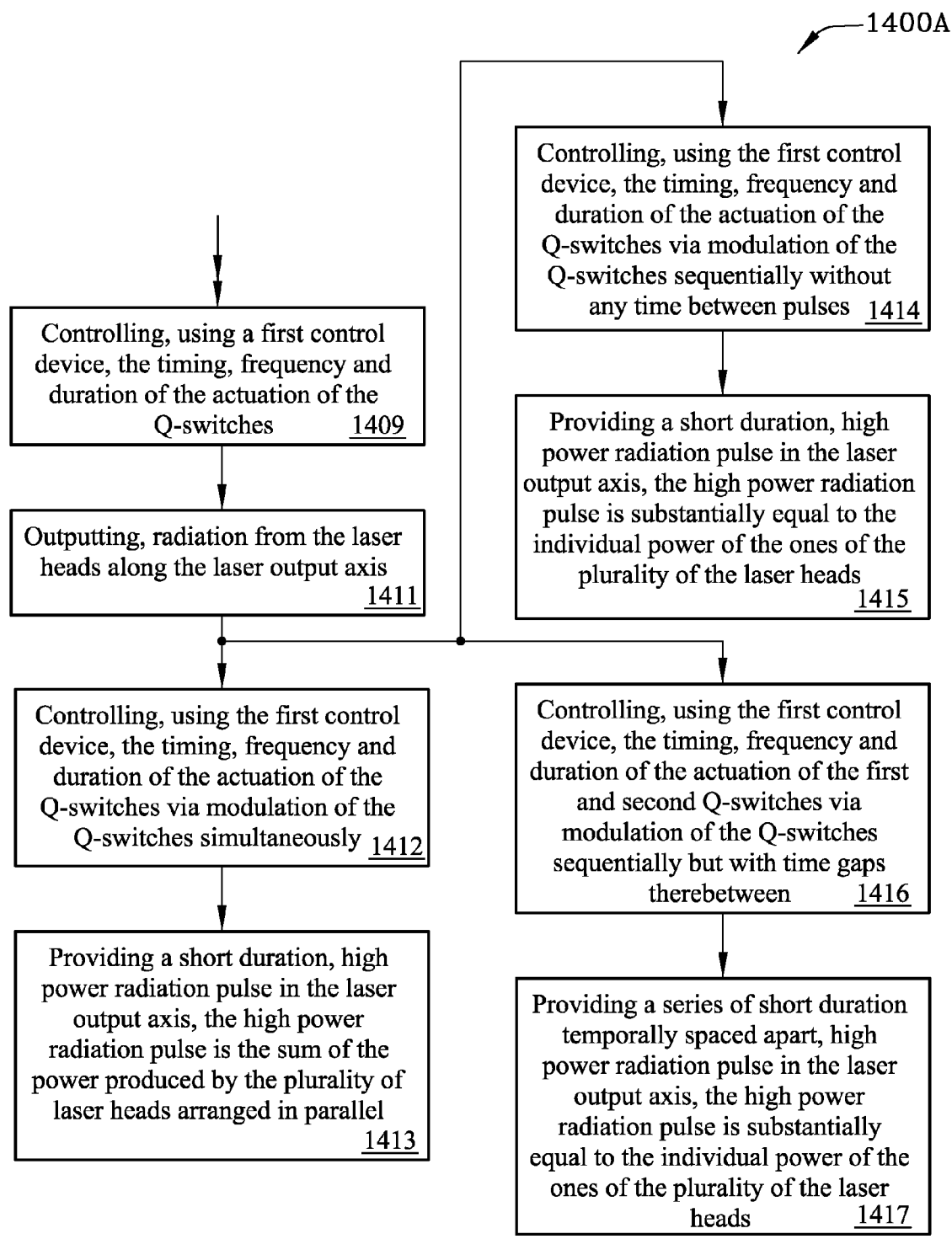

Another exemplary laser beam combining and power scaling method as illustrated in FIG. 14 uses a plurality of laser heads arranged in parallel, the plurality of laser heads emitting radiation, a plurality of respective optical axes aligned with respective ones of the plurality of laser heads, a plurality of first highly reflective mirrors residing perpendicularly with respect to respective ones of the plurality of the optical axes and behind respective ones of the plurality of the laser heads, a plurality of second highly reflective mirrors residing perpendicularly with respect to respective ones of the plurality of optical axes, a plurality of beam splitters arranged at an incidence angle with respect to respective ones of the optical axes aligned with respective ones of the plurality of laser heads, the plurality of beam splitters reside intermediate the respective ones of the plurality of laser heads and the plurality of second highly reflective mirrors, a common laser output axis, and a common output axis highly reflective mirror residing perpendicularly with respect to and along the common laser output axis.

The method as set forth in FIG. 14 comprises the steps of: directing, using the plurality of beam splitters, respective first portions of radiation emitted from the plurality of laser heads along the common laser output axis 1401; directing, using the plurality of beam splitters, respective second portions of the radiation emitted from the plurality of laser heads along the respective ones of the optical axes through the respective beam splitter and toward the plurality of second highly reflective mirrors—1402; reflecting, using the plurality of second highly reflective mirrors residing perpendicularly with respect to respective ones of the plurality of optical axes, the respective plurality of second portions of the radiation emitted from the plurality of laser heads along the respective ones of the optical axes toward the respective ones of the beam splitters—1403; directing, using the plurality of beam splitters, respective first portions of radiation emitted from the respective ones of the plurality of second highly reflective mirrors along the common output axis toward the common output axis highly reflective mirror residing perpendicularly with respect to the common output axis—1404; directing, using the plurality of beam splitters, respective second portions of radiation emitted from the respective ones of the plurality of second highly reflective mirrors toward the respective ones of the plurality of laser heads—1405; reflecting, using the common output axis mirror, the respective first portions of radiation received from the plurality of second highly reflective mirrors toward the plurality of beam splitters—1406; directing, using the plurality of the beam splitters, a plurality of first portions of radiation from the common output axis highly reflective mirror through the beams splitters along the common laser output axis—1407; directing, using the plurality of the beam splitters, a plurality of second portions of radiation from the common output axis highly reflective mirror toward the second highly reflective mirrors—1408; controlling, using a first control device, the timing, frequency and duration of the actuation of the Q-switches—1409; and, outputting, radiation from the plurality of laser heads along the laser output axis—1411.

An exemplary control algorithm may be applied for the plurality of laser heads arranged in parallel. Specifically, the step of controlling, using the first control device, the timing, frequency and duration of the actuation of the Q-switches, includes modulation of the Q-switches simultaneously—1412, thus providing a short duration, high power radiation pulse in the laser output axis. The high power radiation pulse is the sum of the power produced by the plurality of laser heads arranged in parallel—1413.

Alternatively, another exemplary control algorithm, using the first control device, to vary the timing, frequency and duration of the actuation of the Q-switches, includes modulation of the Q-switches sequentially without any time between pulses—1414, thus providing a short duration, high power radiation pulse in the laser output axis. The high power radiation pulse is substantially equal to the individual power of the ones of the plurality of the laser heads—1415.

Still alternatively, another exemplary control algorithm, using the first control device to vary the timing, frequency and duration of the actuation of the Q-switches, includes modulation of the Q-switches sequentially but with time gaps therebetween—1416, thus providing a series of short duration temporally spaced apart, high power radiation pulse in the laser output axis. The high power radiation pulse is substantially equal to the individual power of the ones of the plurality of the laser heads—1417.

REFERENCE NUMERALS

10—prior art laser beam combination system
20—first laser source
22—second laser source
30—fully reflective mirror
32—fully reflective mirror
36—fully reflective mirror
40—beam splitter
50—laser output
51—line
52—optical axis, line
54—optical axis, line
55—optical axis, line
56—optical axis, line
100—prior art standard laser system
101—laser head/medium
102—partially reflective output coupler
103—highly reflective mirror
104—optical axis/line
105—optical axis/line
106—laser output
200—multiple intra-cavity oscillator
201—second laser head/medium
202—optical axis/line, combined output of first and second laser head/medium
203—partially reflective output coupler
204—laser output
300—master oscillator power amplifier (MOPA)
301—second laser source
302—partially reflective output coupler intermediate first laser source and second laser source
303—optical axis/line
304—laser output
400—prior art laser beam combination system
500—continuous wave Q switched laser beam combination system
501—first laser source
501A—vertical acousto-optic Q switch
501B—horizontal electro-optic Q switch
502—second laser source
502A—vertical acousto-optic Q switch
502B—horizontal electro-optic Q switch
503—highly reflective mirror
504—highly reflective mirror
505—highly reflective mirror
506—beamsplitter, 50%
507—laser output
508—optical axis/line
509—optical axis/line
511—optical axis/line
512—optical axis/line
513—optical axis/line
520—first control device
521—second control device
600—continuous wave Q-switched laser beam combination system using three laser sources
600A—current pulsed laser beam combination system without Q-switching
601—first laser source
601A—vertical acousto-optic Q switch
601B—horizontal electro-optic Q switch
602—second laser source
602A—vertical acousto-optic Q switch
602B—horizontal acousto-optic Q switch
603—highly reflective mirror
604—highly reflective mirror
606—beamsplitter, 50%
607—laser output
608—optical axis/line
609—optical axis/line
612—optical axis/line
613—optical axis/line 615—optical axis/line
616—third laser source
616A—vertical acousto-optic Q switch
616B—horizontal acousto-optic Q switch
617—optical axis/line
618—highly reflective mirror
620—first control device
621—second control device for constant direct current application to the laser heads
622—current pulsing of the laser heads
700—continuous wave Q-switched laser beam combination system employing 4 or more laser sources
700A—current pulsed laser beam combination system employing 4 or more laser sources without Q-switching
701—laser source
701A, 702A, 703A, 704A, 705A—vertical acousto-optic Q switch
701B—highly reflective mirror
701C—highly reflective mirror
701D, 702S, 703D, 704D, 705D—horizontal acousto-optic Q switch
701S, 702S, 703S, 704S, 705S—beamsplitter, 50%
702—laser source
702B—highly reflective mirror
702C—highly reflective mirror
703—laser source
703B—highly reflective mirror
703C—highly reflective mirror
704—laser source
704B—highly reflective mirror
704C—highly reflective mirror
705—laser source
705B—highly reflective mirror
705C—highly reflective mirror
706, 707, 708, 709, 710—output optical axis/line
711—laser output
712, 717—first optical axis/line
713, 718—second optical axis/line
714, 719—third optical axis/line
715, 720—fourth optical axis/line
716, 721—fifth optical axis/line
727—optical axis/line
728—optical axis/line
729—optical axis/line
730—optical axis/line
731—optical axis/line
740—first control device
741—second control device for constant direct current application to the laser heads
742—current pulse control of the laser heads
777—highly reflective mirror
800—Q-switch modulation timing diagram for example disclosed in FIGS. 6, 11 and 12
801—impulse to Q-switch occurring simultaneously with impulse 802 and 803, removing deflection of laser beam
802—impulse to Q-switch occurring simultaneously with impulse 801 and 803 removing deflection of laser beam
803—impulse to Q-switch occurring simultaneously with impulse 801 and 802 removing deflection of laser beam
900—Q-switch modulation timing diagram for example disclosed in FIGS. 6, 11 and 12
901—sequential impulse to Q-switch removing deflection of laser beam
902—sequential impulse to Q-switch removing deflection of laser beam after impulse 901
903—sequential impulse to Q-switch removing deflection of laser beam after impulse 902
1000—Q-switch modulation timing diagram for example disclosed in FIGS. 6, 11 and 12
1001—sequential impulse to Q-switch removing deflection of laser beam
1002—sequential impulse to Q-switch removing deflection of laser beam after impulse 1001
1003—sequential impulse to Q-switch removing deflection of laser beam after impulse 1002
1100—top view corresponding to the schematic view of FIG. 6
1101—mounting frame
1102—aperture, mode control device producing higher quality beams, blocks stray rays
1103—aperture, mode control device producing higher quality beams, blocks stray rays
1104—aperture, mode control device producing higher quality beams, blocks stray rays
1105—aperture, mode control device producing higher quality beams, blocks stray rays
1106—aperture, mode control device producing higher quality beams, blocks stray rays
1107—aperture, mode control device producing higher quality beams, blocks stray rays
1111—side of mounting frame
1187—steering/folding mirror
1189—steering/folding mirror
1200—perspective view corresponding to the schematic view of FIG. 6
1300—laser beam combining and power scaling method using first, second and third laser heads having first, second and third optical axes
1301—emitting radiation from the first laser head along the first axis into and through the beam splitter
1302—directing, using the beam splitter, a first portion of the radiation emitted from the first laser head into the third laser head along the third optical axis
1303—directing, using the beam splitter, a second portion of the radiation emitted from the first laser head along the laser output axis coincident with the second optical axis
1304—emitting radiation for the third laser head along the third axis into and through the beam splitter
1305—directing, using the beam splitter, a first portion of the radiation emitted from the third laser head into the first laser head along the first optical axis
1306—directing, using the beam splitter, a second portion of the radiation emitted from the third laser head along the second optical axis into the second laser head emitting radiation from the second laser head along the second axis into and through the beam splitter
1307—directing, using the beam splitter, a first portion of the radiation emitted from the second laser head along the laser output axis
1308—directing, using the beam splitter, a second portion of the radiation emitted from the second laser head along the third optical axis and into the third laser head
1309—controlling, using a first control device, the timing, frequency and duration of the actuation of the first, second and third Q-switches
1311—outputting, radiation from the first, second and third laser heads along the laser output axis
1312—controlling, using a first control device, the timing, frequency and duration of the actuation of the first and second Q-switches includes modulation of the first, second and third Q-switches simultaneously 1313—providing a short duration, high power radiation pulse in the laser output axis, the high power radiation pulse is the sum of the power produced by the first, second and third laser heads.

1314—controlling, using a first control device, the timing, frequency and duration of the actuation of the first, second and third Q-switches includes modulation of the first and second Q-switches sequentially without any time between pulses 1315—providing a short duration, high power radiation pulse in the laser output axis, the high power radiation pulse is substantially equal to the individual power of the first and second laser heads 1316—controlling, using a first control device, the timing, frequency and duration of the actuation of the first and second Q-switches includes modulation of the first, second and third Q-switches sequentially but with time gaps therebetween 1317—providing a series of short duration temporally spaced apart, high power radiation pulse in the laser output axis, the high power radiation pulse is substantially equal to the individual power of the first, second and third laser heads.

1400—a laser beam combining and power scaling method using a plurality of laser heads arranged in parallel, 1401—directing, using the plurality of beam splitters, respective first portions of radiation emitted from the plurality of laser heads along the common laser output axis 1402—directing, using the plurality of beam splitters, respective second portions of the radiation emitted from the plurality of laser heads along the respective ones of the optical axes toward the plurality of second highly reflective mirrors 1403—reflecting, using the plurality of second highly reflective mirrors residing perpendicularly with respective ones of the plurality of optical axes, the respective plurality of second portions of the radiation emitted from the plurality of laser heads along the respective ones of the optical axes toward the respective ones of the beam splitters 1404—directing, using the plurality of beam splitters, respective first portions of radiation emitted from the respective ones of the plurality of second highly reflective mirrors along the common output axis toward the common output axis highly reflective mirror residing perpendicularly to the common output axis 1405—directing, using the plurality of beam splitters, respective second portions of radiation emitted from the respective ones of the plurality of second highly reflective mirrors toward the respective ones of the plurality of laser heads 1406—reflecting, using the common output axis mirror, the respective first portions of radiation received from the plurality of second highly reflective mirrors toward the plurality of beam splitters 1407—directing, using the plurality of the beam splitters, a plurality of first portions of radiation from the common output axis highly reflective mirror through the beam splitters along the common laser output axis 1408—directing, using the plurality of the beam splitters, a plurality of second portions of radiation from the common output axis highly reflective mirror toward the second highly reflective mirrors 1409—controlling, using a first control device, the timing, frequency and duration of the actuation of the Q-switches 1411—outputting, radiation from the laser heads along the laser output axis 1412—controlling, using the first control device, the timing, frequency and duration of the actuation of the Q-switches via modulation of the Q-switches simultaneously 1413—providing a short duration, high power radiation pulse in the laser output axis, the high power radiation pulse is the sum of the power produced by the plurality of laser heads arranged in parallel 1414—controlling, using the first control device, the timing, frequency and duration of the actuation of the Q-switches via modulation of the Q-switches sequentially without any time between pulses 1415—providing a short duration, high power radiation pulse in the laser output axis, the high power radiation pulse is substantially equal to the individual power of the ones of the plurality of the laser heads 1416—controlling, using the first control device, the timing, frequency and duration of the actuation of the first and second Q-switches via modulation of the Q-switches sequentially but with time gaps therebetween 1417—providing a series of short duration temporally spaced apart, high power radiation pulse in the laser output axis, the high power radiation pulse is substantially equal to the individual power of the ones of the plurality of the laser heads.

Those skilled in the art will readily recognize that the invention has been set forth by way of example and that changes may be made to the invention without departing from the spirit and the scope of the appended claims.

The invention claimed is:

1. A laser beam combining and power scaling device, comprising:

a plurality of laser heads arranged in parallel; said plurality of laser heads emitting radiation;

a plurality of respective optical axes aligned with respective ones of said plurality of laser heads;

a plurality of first highly reflective mirrors residing perpendicularly with respective ones of said plurality of said optical axes and behind respective ones of said plurality of said laser heads;

a plurality of second highly reflective mirrors residing perpendicularly with respective ones of said plurality of optical axes;

a plurality of beam splitters arranged at an incidence angle with respect to respective ones of said optical axes and residing intermediate said respective ones of said plurality of laser heads and said plurality of second highly reflective mirrors;

a common laser output axis;

said plurality of beam splitters directing respective first portions of radiation emitted from said plurality of laser heads along said common laser output axis and said plurality of beam splitters directing respective second portions of said radiation emitted from said plurality of laser heads along said respective ones of said optical axes toward said plurality of second highly reflective mirrors;

a common output axis highly reflective mirror residing perpendicularly along said common laser output axis;

said plurality of second highly reflective mirrors residing perpendicularly with respective ones of said plurality of optical axes reflecting said respective plurality of second portions of said radiation emitted from said plurality of laser heads along said respective ones of said optical axes toward said respective ones of said beam splitters;

said plurality of beam splitters directing respective first portions of radiation emitted from said respective ones of said plurality of second highly reflective mirrors along said common output axis toward said common output axis highly reflective mirror residing perpendicularly to said common output axis and said plurality of beam splitters directing respective second portions of radiation emitted from said respective ones of said plurality of second highly reflective mirrors toward said respective ones of said plurality of laser heads;

said common output axis mirror reflecting said respective first portions of radiation received from said plurality of second highly reflective mirrors toward said plurality of beam splitters;

said plurality of said beam splitters directing a plurality of first portions of radiation from said common output axis highly reflective mirror and said first portions of radiation emitted from said plurality of laser heads along said common laser output axis;

a plurality of first Q-switches residing in respective ones of said plurality of said optical axes between said respective ones of said laser heads and said plurality of said first highly reflective mirrors;

a first control device, said first control device varies the timing, frequency and duration of the actuation of said first Q-switches and modulates said first Q-switches simultaneously, providing a short duration, high power radiation pulse in said common laser output axis, and said high power radiation pulse is the sum of the power produced by said laser heads.

2. A laser beam combining and power scaling device as claimed in claim 1 wherein said laser heads are diode pumped.

3. A laser beam combining and power scaling device as claimed in claim 1 wherein said plurality of first Q-switches are vertical Q-switches.

4. A laser beam combining and power scaling device as claimed in claim 1, further comprising: a plurality of second Q-switches residing in respective ones of said plurality of said optical axes between said plurality of first Q-switches and said respective ones of said laser heads.

5. A laser beam combining and power scaling device as claimed in claim 4 wherein said plurality of first Q-switches are vertical Q-switches and said plurality of second Q-switches are horizontal Q-switches.

6. A laser beam combining and power scaling device as claimed in claim 1, wherein said each of said plurality of laser heads includes an NdYAG gain medium.

* * * * *